US011950690B2

(12) United States Patent
Wiedeman et al.

(10) Patent No.: US 11,950,690 B2
(45) Date of Patent: *Apr. 9, 2024

(54) COLLAPSIBLE STANDING DESK

(71) Applicants: Derrek Wiedeman, Wilmington, DE (US); Brandon Middleton, Davidsonville, MD (US)

(72) Inventors: Derrek Wiedeman, Wilmington, DE (US); Brandon Middleton, Davidsonville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,337

(22) Filed: Aug. 15, 2022

(65) Prior Publication Data
US 2024/0049877 A1    Feb. 15, 2024

(51) Int. Cl.
| | |
|---|---|
| *A47B 21/02* | (2006.01) |
| *A47B 3/083* | (2006.01) |
| *A47B 9/16* | (2006.01) |
| *A47B 9/20* | (2006.01) |
| *F16M 11/12* | (2006.01) |
| *F16M 11/32* | (2006.01) |

(52) U.S. Cl.
CPC .............. *A47B 21/02* (2013.01); *A47B 3/083* (2013.01); *A47B 9/16* (2013.01); *A47B 9/20* (2013.01); *F16M 11/126* (2013.01); *F16M 11/32* (2013.01); *F16M 2200/022* (2013.01)

(58) Field of Classification Search
CPC ................................ A47B 9/20; A47B 13/081
USPC .............. 108/95, 49, 65, 69, 77, 88, 157.16; 248/188.7, 188.5, 161, 132, 157
See application file for complete search history.

(56) References Cited

U.S. PATENT DOCUMENTS

| | | | | |
|---|---|---|---|---|
| 554,661 | A * | 2/1896 | Doolittle | A47G 7/041 403/186 |
| 2,586,724 | A * | 2/1952 | Sannebeck | A47C 3/34 108/138 |
| 3,145,966 | A * | 8/1964 | Landon | A47B 97/08 108/115 |
| 3,212,748 | A * | 10/1965 | Faurot | A47B 23/04 248/458 |
| 5,746,334 | A * | 5/1998 | Brandenberg | A47B 9/14 211/205 |
| 6,082,838 | A * | 7/2000 | Bissu-Palombo | A47B 21/0314 108/50.01 |
| 6,282,084 | B1 * | 8/2001 | Goerdt | G06F 1/1656 248/676 |

(Continued)

OTHER PUBLICATIONS

Alexey Ukhnalev, Tripodsy, https://www.indiegogo.com/projects/-274996?fbclid=IwAR0tbP1yv0POQ6XVTO8Bq131X126rqKZJ4uzECg0M5FrhclodDTpf2m0Nec#/.

(Continued)

*Primary Examiner* — Jose V Chen
(74) *Attorney, Agent, or Firm* — The Iwashko Law Firm, PLLC; Lev Ivan Gabriel Iwashko

(57) ABSTRACT

A collapsible standing desk, including a top platform to receive at least one first item thereon, a bottom platform connected to the top platform to receive at least one second item and at least one third item thereon, a base removably connected to the top platform and the bottom platform to support the top platform and the bottom platform thereon while disposed on an external surface, and a center pole removably connected to the base to connect the top platform and the bottom platform to the base.

19 Claims, 16 Drawing Sheets

(56) References Cited

U.S. PATENT DOCUMENTS

| | | | | |
|---|---|---|---|---|
| 6,298,794 | B1* | 10/2001 | Brown | A47B 21/00 108/50.01 |
| 6,748,873 | B2* | 6/2004 | Brown, Sr. | A47B 23/041 248/161 |
| 7,240,886 | B2* | 7/2007 | Jones | F16M 11/08 248/161 |
| 7,744,048 | B1* | 6/2010 | McKellery | F16M 11/046 248/176.1 |
| 8,191,487 | B2* | 6/2012 | Theesfeld | F16M 11/24 108/50.01 |
| 9,833,892 | B1* | 12/2017 | Gomez | B25H 1/12 |
| 10,323,785 | B1* | 6/2019 | Takahashi | F16M 11/12 |
| 2002/0170470 | A1* | 11/2002 | Cheng | B60N 3/002 108/69 |
| 2004/0211343 | A1* | 10/2004 | Song | A47B 21/03 108/50.01 |
| 2010/0258039 | A1* | 10/2010 | Liu | F16B 12/22 108/157.16 |
| 2011/0232540 | A1* | 9/2011 | Benoni | F16M 13/00 248/371 |
| 2013/0293719 | A1* | 11/2013 | Ashe | F16M 13/04 348/157 |
| 2016/0008070 | A1* | 1/2016 | Choudhury | A47B 9/20 108/106 |

OTHER PUBLICATIONS

Tripodsy Store, Tripodsy, https://www.amazon.com/dp/B09PBK55DJ?m=AWHP0VORHBDUT&ref=mpc_asin_title, Dec. 28, 2021.

Tripodsy, Tripodsy, https://tripodsy.com/products/tripodsy-portable-standing-adjustable-workstation.

Tripodsy, https://www.facebook.com/tripodsy, Jan. 4, 2022.

* cited by examiner

COLLAPSIBLE STANDING DESK

BACKGROUND

1. Field

The present general inventive concept relates generally to a desk, and particularly, to a collapsible standing desk.

2. Description of the Related Art

For many people who travel, the only usable workspace is usually a sitting desk at a hotel, office, and/or coworking space. Most of the aforementioned facilities, rarely offer a standing desk, as an alternative workspace. However, the standing desk is often preferable to the sitting desk since it provides a workspace while the person is standing, which is better for a back of a person.

Also, the standing desk often takes up more space, which causes difficulty to store the standing desk at home on a permanent basis.

Therefore, there is a need for a collapsible standing desk that is portable for travel and can be easily stored after being collapsed.

SUMMARY

The present general inventive concept provides a collapsible standing desk.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a collapsible standing desk, including a top platform to receive at least one first item thereon, a bottom platform connected to the top platform to receive at least one second item and at least one third item thereon, a base removably connected to the top platform and the bottom platform to support the top platform and the bottom platform thereon while disposed on an external surface, and a center pole removably connected to the base to connect the top platform and the bottom platform to the base.

The top platform and the bottom platform may each include a first section, and a second section movably disposed on at least a portion of the first section to move toward the first section in a first rotational direction, and away from the first section in a second rotational direction opposite with respect to the first rotational direction.

The first section may include a first knob receiving aperture disposed on at least a portion of the first section.

The second section may include a second knob receiving aperture disposed on at least a portion of the second section.

The top platform and the bottom platform may each further include a first knob movably disposed on at least a portion of the first section to loosen from the first section in response to moving in a first direction and tighten against the first section in response to moving in a second direction, and a second knob movably disposed on at least a portion of the second section to loosen from the second section in response to moving in a first direction and tighten against the second section in response to moving in a second direction.

The first knob receiving aperture may receive the first knob and the second knob receiving aperture receives the second knob in response to folding the first section against the second section.

The base may include a center pole connector to receive the center pole therein, and a plurality of telescopic legs movably disposed on at least a portion of the center pole connector to move from retracted against the center pole connector in a first position to at least partially extended away from the center pole connector in a second position, and move from extended away from the center pole connector in the second position to retracted against the center pole connector in the first position.

The base may further include a plurality of section locks movably disposed on at least a portion of each of the plurality of telescopic legs to prevent at least one section of each of the plurality of telescopic legs from being extracted in a first position, and allow the at least one section of each of the plurality of telescopic legs to be extracted in a second position.

The center pole may include a pole body, and a pole release knob disposed at an end of the pole body to allow the pole body to be extracted from the base in response to being removed from the pole body, and prevent the pole body from being extracted from the base in response to at least partially connecting to the pole body.

The collapsible standing desk may further include a platform adjuster removably connected to the center pole to receive the top platform thereon and adjust a position of the top platform in response to moving the platform adjuster.

The platform adjuster may include an adjuster body, a connector receiving channel disposed on at least a portion of the adjuster body, a plurality of walls disposed on each side of the connector receiving channel, such that the connector receiving channel is recessed with respect to the plurality of walls, and a connector adjustment knob movably disposed on at least a portion of the adjuster body.

The collapsible standing desk may further include a top connector removably connected to the to the adjuster body to receive the top platform thereon.

The top connector may include a top connector body, a first knob connecting aperture disposed at a first end of the top connector body to receive a first knob of the top platform therein, a second knob connecting aperture disposed at a second end of the top connector body to receive a second knob of the top platform therein, and a platform connecting body removably connected to at least a portion of the top connector body to removably connect to the connector receiving channel.

The connector adjustment knob may prevent movement of the platform connecting body within the connector receiving channel in response to moving in a first direction, and allows movement of the platform connecting body within the connector receiving channel in response to moving in a second direction.

The top connector may further include a first securing fastener removably connected into the platform connecting body to connect the platform connecting body to the top connector body, and a second securing fastener removably connected into the platform connecting body to connect the platform connecting body to the top connector body.

The collapsible standing desk may further include a bottom connector removably connected to the to the center pole to receive the bottom platform thereon.

The bottom connector may include a bottom connector body, a first knob connecting aperture disposed at a center of the bottom connector body to receive a first knob of the bottom platform therein, a second knob connecting aperture disposed at a first end of the bottom connector body to receive a second knob of the bottom platform therein, and a clamp disposed at a second end of the bottom connector body to receive the center pole therethrough.

The top platform may be disposed on a first plane and the bottom platform is disposed on a second plane different from the first plane.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
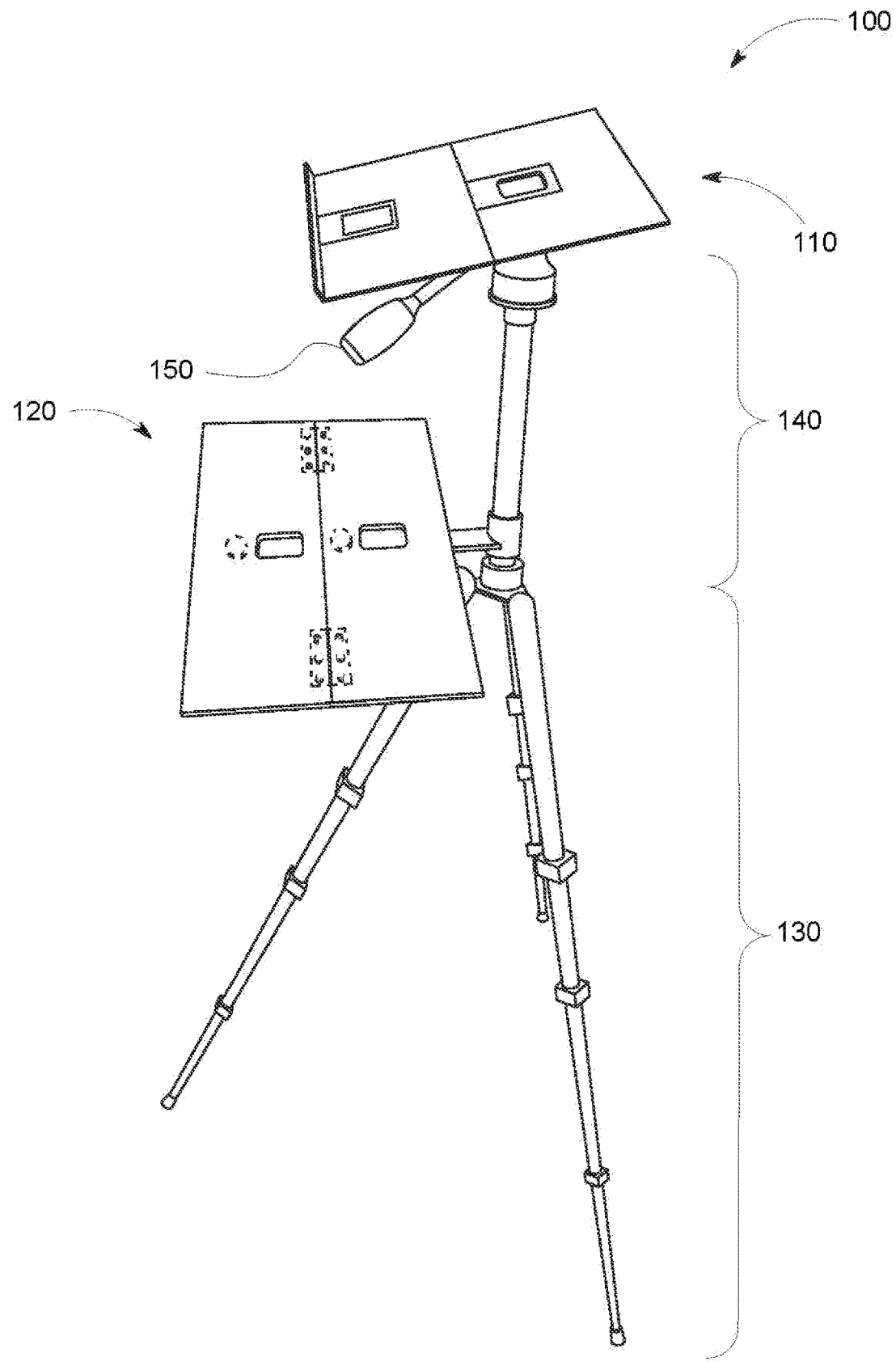
FIG. 1A illustrates a top isometric view of a collapsible standing desk, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Collapsible Standing Desk 100
Top Platform 110
First Section 111
First Knob Receiving Aperture 111a
Elevated Edge 111b
Second Section 112
Second Knob Receiving Aperture 112a Hinges 113
First Knob 114
Second Knob 115
Bottom Platform 120
First Section 121
First Knob Receiving Aperture 121a
Second Section 122
Second Knob Receiving Aperture 122a
Hinges 123
First Knob 124
Second Knob 125
Base 130
Center Pole Connector 131
Telescopic Legs 132
First Leg Section 132a
Second Leg Section 132b
Third Leg Section 132c
Fourth Leg Section 132d
Section Locks 133
Center Pole Lock 134
Stabilizing Pads 135
Center Pole 140
Pole Body 141
Platform Adjuster Connector 142
Pole Release Knob 143
Platform Adjuster 150
Adjuster Body 151
Connector Receiving Channel 152
Walls 153
Connector Adjustment Knob 154
Handle 155
Base Connector 156
Base Adjustment Knob 157
Top Connector 160
Top Connector Body 161
First Knob Connecting Aperture 162
Second Knob Connecting Aperture 163
Platform Connecting Body 164
First Securing Fastener 165
First Fastener Handle 165a
Second Securing Fastener 166
Second Fastener Handle 166a
First Fastener Aperture 167
Second Fastener Aperture 168
Bottom Connector 170
Bottom Connector Body 171
First Knob Connecting Aperture 172
Second Knob Connecting Aperture 173
Clamp 174
Clamp Knob 175

FIG. 1A illustrates a top isometric view of a collapsible standing desk 100, according to an exemplary embodiment of the present general inventive concept.

Figure 1B:
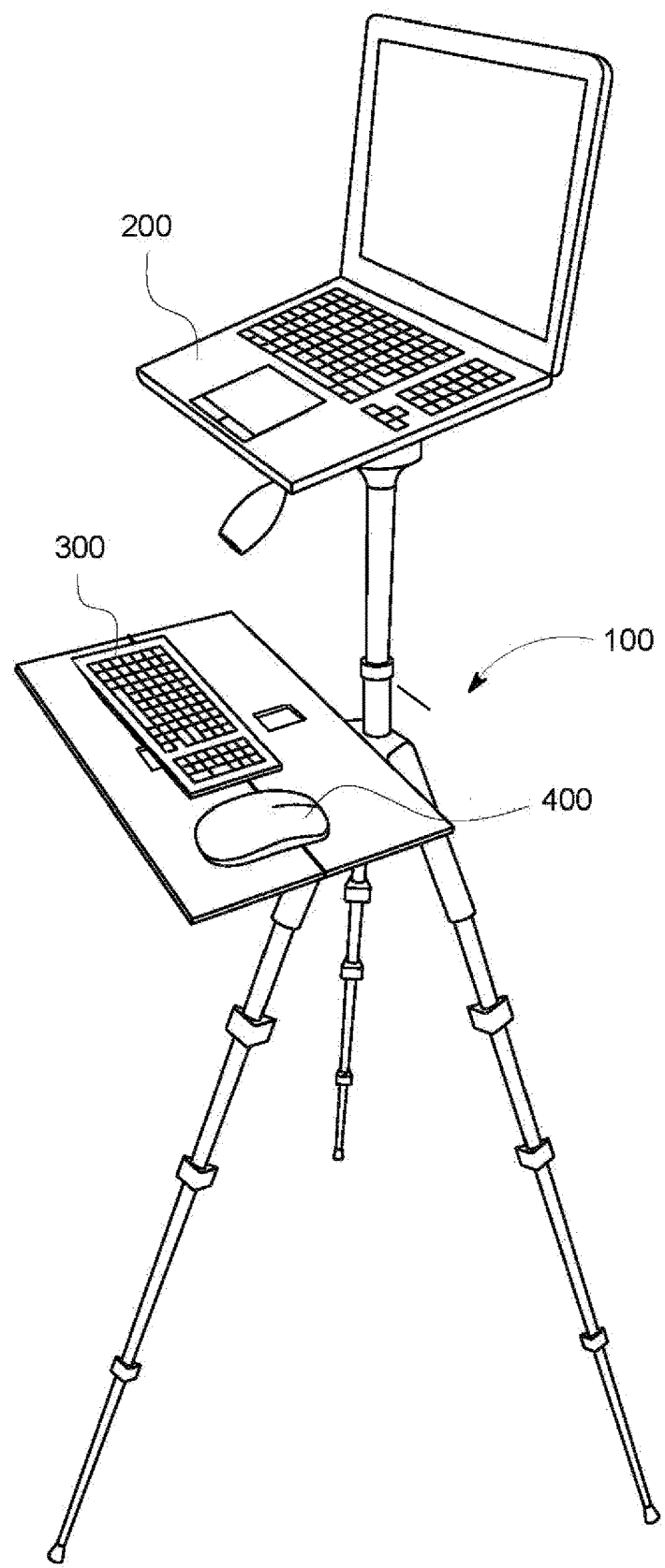
FIG. 1B illustrates a top isometric view of the collapsible standing desk with a laptop computer disposed thereon, according to an exemplary embodiment of the present general inventive concept.

FIG. 1B illustrates a top isometric view of the collapsible standing desk 100 with a laptop computer disposed thereon, according to an exemplary embodiment of the present general inventive concept.

Figure 2A:
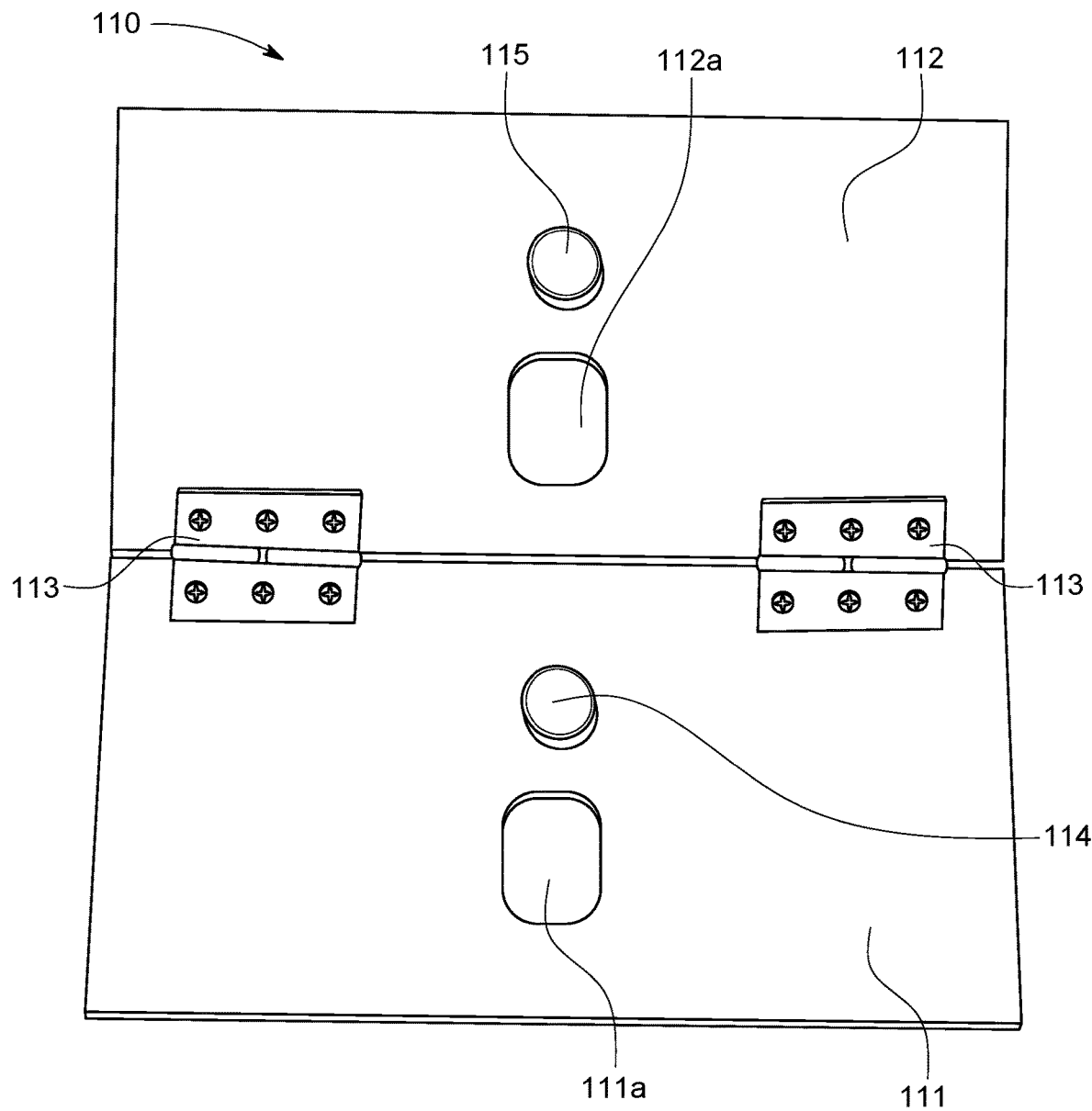
FIG. 2A illustrates a bottom perspective view of a top platform, according to an exemplary embodiment of the present general inventive concept.

FIG. 2A illustrates a bottom perspective view of a top platform 110, according to an exemplary embodiment of the present general inventive concept.

Figure 2B:
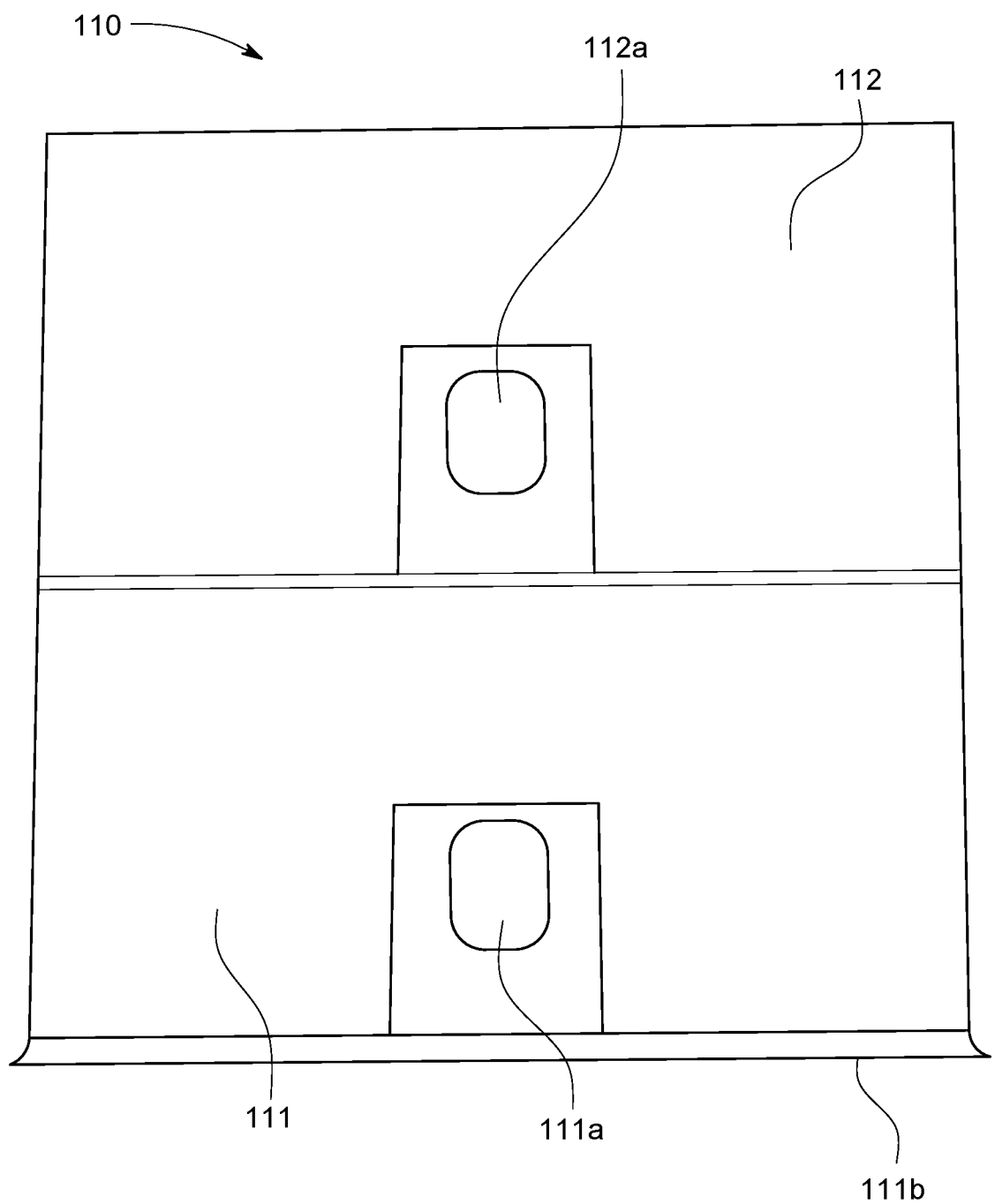
FIG. 2B illustrates a top perspective view of the top platform, according to an exemplary embodiment of the present general inventive concept.

FIG. 2B illustrates a top perspective view of the top platform 110, according to an exemplary embodiment of the present general inventive concept.

The collapsible standing desk 100 may be constructed from at least one of metal, plastic, wood, and rubber, etc., but is not limited thereto.

The collapsible standing desk 100 may include a top platform 110, a bottom platform 120, a base 130, a center pole 140, a platform adjuster 150, a top connector 160, and a bottom connector 170, but is not limited thereto.

Referring to FIGS. 1A through 2B, the top platform 110 is illustrated to have a rectangular prism shape. However, the top platform 110 may be rectangular, circular, cylindrical, triangular, pentagonal, hexagonal, heptagonal, octagonal, or any other shape known to one of ordinary skill in the art, but is not limited thereto.

The top platform 110 may include a first section 111, a second section 112, a plurality of hinges 113, a first knob 114, and a second knob 115, but is not limited thereto.

The first section 111 may include a first knob receiving aperture 111a and an elevated edge 111b, but is not limited thereto.

The first section 111 may be a planar surface. Moreover, the first section 111 may receive at least a first portion of at least one first item 200 thereon.

The first knob receiving aperture 111a may be disposed on at least a portion of a center portion of the first section 111.

The elevated edge 111b may be disposed on at least a portion of an edge of the first section 111. The elevated edge 111b may be elevated with respect to other portions of a surface of the first section 111 beyond a boundary of the elevated edge 111b.

The second section 112 may include a second knob receiving aperture 112a, but is not limited thereto.

The second section 112 may be a planar surface. The second section 112 may be disposed on at least a portion of the first section 111. The second section 112 may receive at least a second portion of the at least one first item 200 thereon. Additionally, the second section 112 may move (i.e., pivot, rotate) toward the first section 111 in a first rotational direction. Conversely, the second section 112 may move away from the first section 111 in a second rotational direction opposite with respect to the first rotational direction. As such, the second section 112 may fold and/or collapse against the first section 111 for storage.

The second knob receiving aperture 112a may be disposed on at least a portion of a center portion of the second section 112. Referring to FIGS. 2A and 2B, it is important to note that the first knob receiving aperture 111a as disposed on the first section 111 may differ in positioning from the second knob receiving aperture 112a as disposed on the second section 112.

Collectively, the first section 111 and/or the second section 112 may receive the at least one first item 200. For example, a top surface of the first section 111 and/or a top surface of the second section 112 may receive the at least one first item 200, such as a laptop computer, a desktop computer, a tablet computer, a notebook, a monitor, a display unit (e.g., a screen), and/or a notepad. As such, the first section 111 and/or the second section 112 may have a size (e.g., length, width, dimension) corresponding to a size of the at least one first item 200. Also, referring to FIG. 1B, the elevated edge 111a may prevent the at least one first item 200 from moving (e.g., falling) off the first section 111 and/or the second section 112 in a lateral direction toward the elevated edge 111b.

The plurality of hinges 113 may be disposed between at least a portion of the first section 111 and/or the second section 112. Each of the plurality of hinges 113 may facilitate movement (i.e., pivot, rotate) of the second section 112 with respect to the first section 111.

The first knob 114 may be movably (i.e., rotatably) disposed on at least a portion of the center portion of the first section 111. The first knob 114 may move from disposed against the first section 111 in a first position to at least partially disposed away from the first section 111 in a second position in response to being moved in a first direction (i.e., clockwise) or a second direction (i.e., counterclockwise). Conversely, the first knob 114 may move from disposed away from the first section 111 in the second section to disposed against the first section 111 in the first position in response to being moved in the second direction or the first direction. In other words, the first knob 114 may be loosened from the first section 111 in response to being moved (i.e., rotated) in the first direction or the second direction, and tightened against the first section 111 in response to being moved in the second direction or the first direction.

The second knob 115 may be movably (i.e., rotatably) disposed on at least a portion of the center portion of the second section 112. The second knob 115 may move from disposed against the second section 112 in a first position to at least partially disposed away from the second section 112 in a second position in response to being moved in a first direction (i.e., clockwise) or a second direction (i.e., counterclockwise). Conversely, the second knob 115 may move from disposed away from the second section 112 in the second section to disposed against the second section 112 in the first position in response to being moved in the second direction or the first direction. In other words, the second knob 115 may be loosened from the second section 112 in response to being moved (i.e., rotated) in the first direction or the second direction, and tightened against the second section 112 in response to being moved in the second direction or the first direction.

During folding of the first section 111 and/or the second section 112, the first knob receiving aperture 111a may receive the first knob 114 therein and/or the second knob receiving aperture 112a may receive the second knob 115 therein. Accordingly, the first knob 114 may be removably inserted into the first knob receiving aperture 111a and/or the second knob 115 may be removably inserted in the second knob receiving aperture 112a. As such, absence of the first knob receiving aperture 111a and/or the second knob receiving aperture 112a may prevent the first section 111 and/or the second section 112 from being folded such that the first section 111 and/or the second section 112 may be flush and/or stored in a compact manner.

Figure 3A:
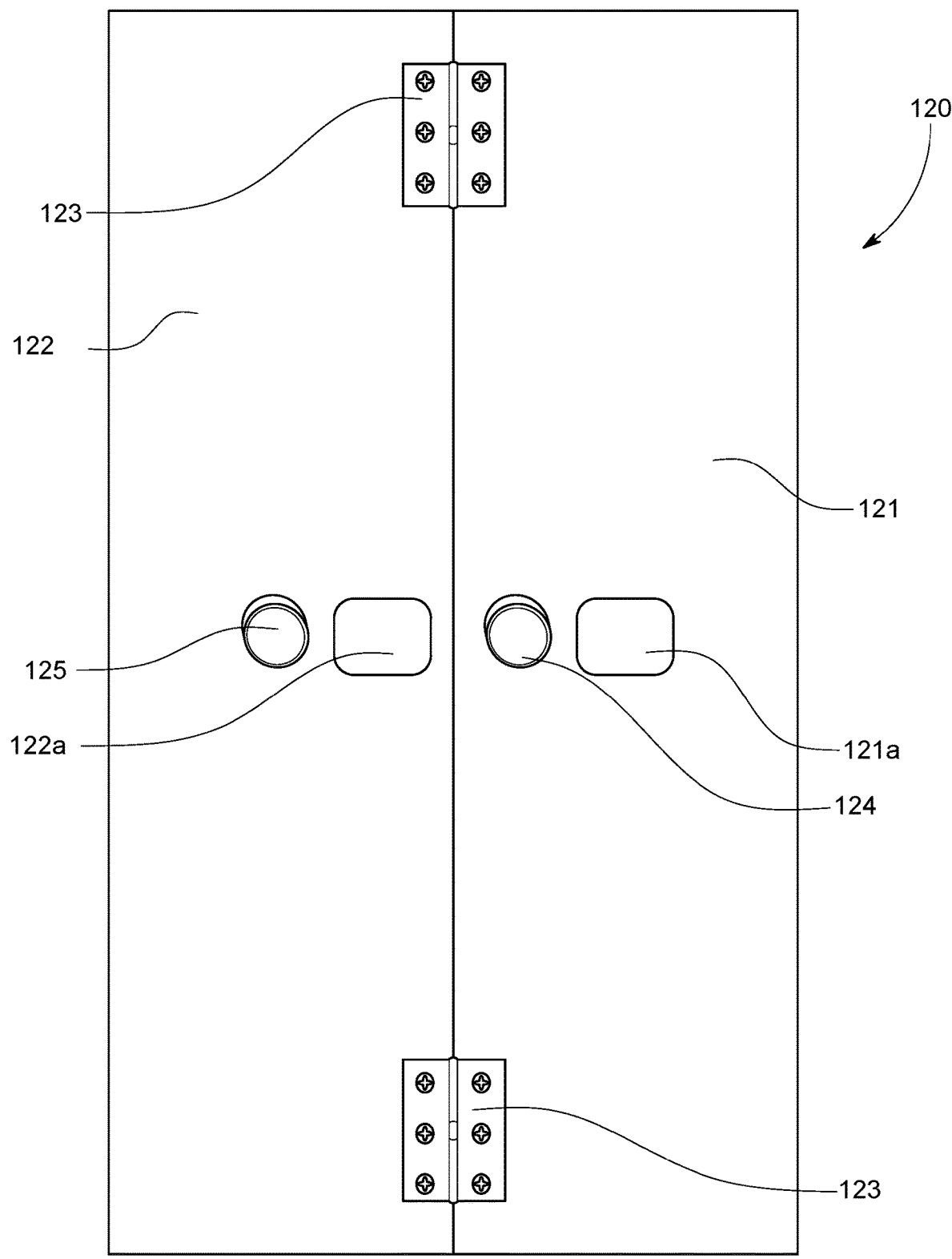
FIG. 3A illustrates a bottom perspective view of a bottom platform, according to an exemplary embodiment of the present general inventive concept.

FIG. 3A illustrates a bottom perspective view of a bottom platform 120, according to an exemplary embodiment of the present general inventive concept.

Figure 3B:
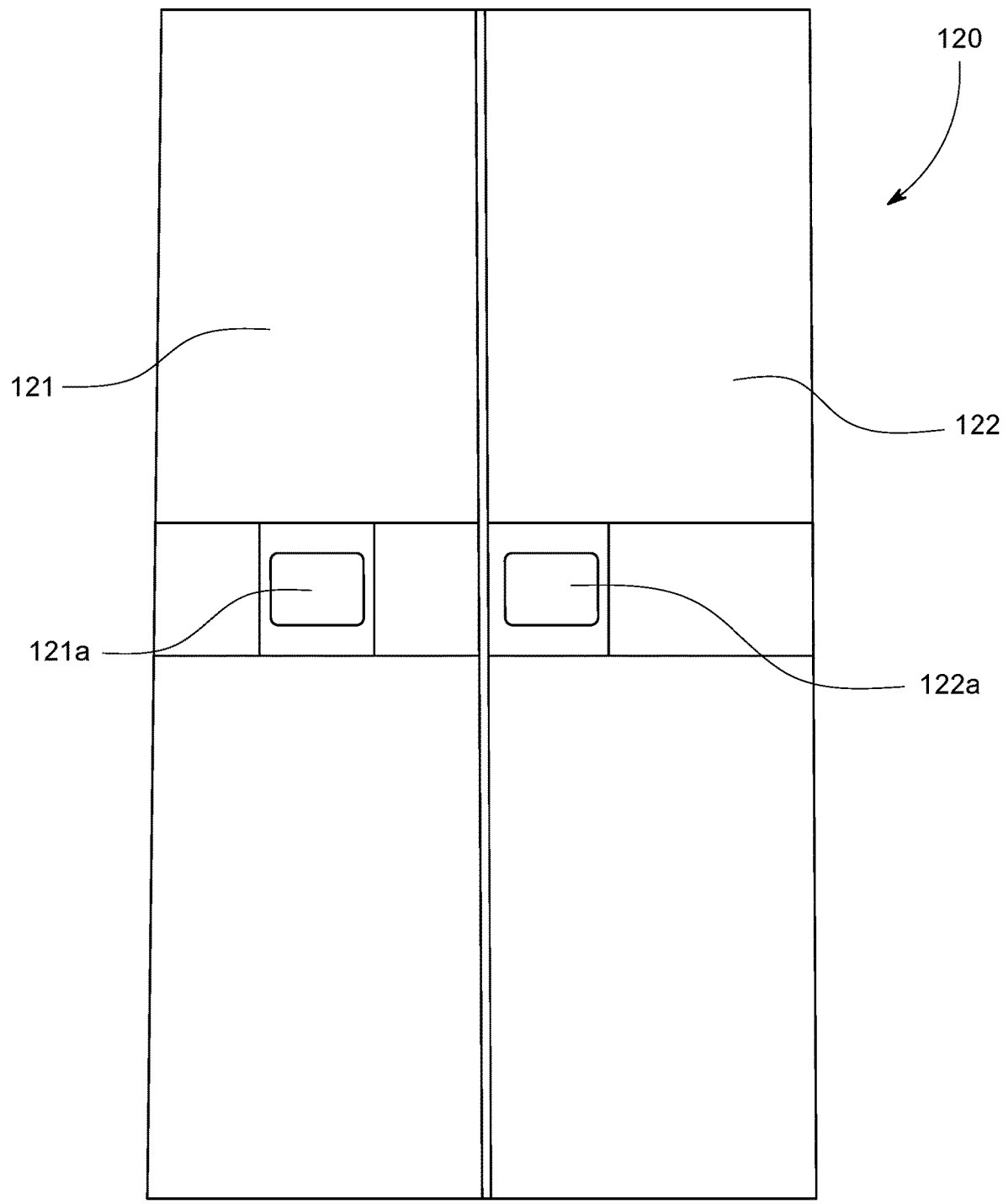
FIG. 3B illustrates a top perspective view of the bottom platform, according to an exemplary embodiment of the present general inventive concept.

FIG. 3B illustrates a top perspective view of the bottom platform 120, according to an exemplary embodiment of the present general inventive concept.

Figure 3C:
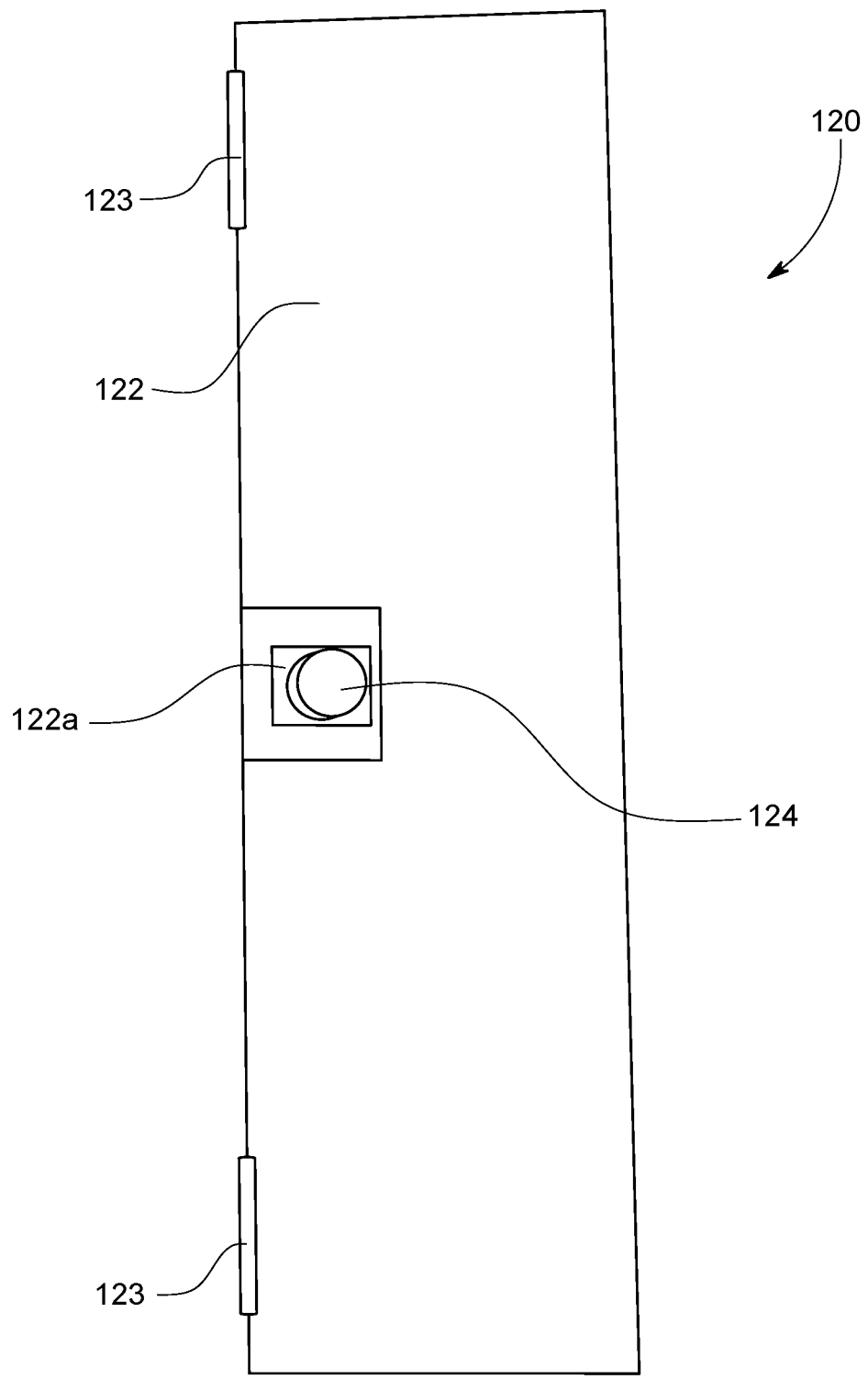
FIG. 3C illustrates a perspective view of the bottom platform in a folded position, according to an exemplary embodiment of the present general inventive concept.

FIG. 3C illustrates a perspective view of the bottom platform 120 in a folded position, according to an exemplary embodiment of the present general inventive concept.

The bottom platform 120 may include a first section 121, a second section 122, a plurality of hinges 123, a first knob 124, and a second knob 125, but is not limited thereto.

The first section 121 may include a first knob receiving aperture 121a, but is not limited thereto.

The first section 121 may be a planar surface. Moreover, the first section 121 may receive at least a first portion of at least one second item 300 and/or at least a first portion of at least one third item 400 thereon.

The first knob receiving aperture 121a may be disposed on at least a portion of a center portion of the first section 121.

The second section 122 may include a second knob receiving aperture 122a, but is not limited thereto.

The second section 122 may be a planar surface. The second section 122 may be disposed on at least a portion of the first section 121. The second section 122 may receive at least a second portion of the at least one second item 300 and/or at least a second portion of the at least one third item 400 thereon. Additionally, the second section 122 may move (i.e., pivot, rotate) toward the first section 121 in a first rotational direction. Conversely, the second section 122 may move away from the first section 121 in a second rotational direction opposite with respect to the first rotational direction. As such, referring to FIG. 3C, the second section 122 may fold and/or collapse against the first section 121 for storage. It is important to note that the top platform 110 may appear similarly to the bottom platform 120 while folded and/or collapsed.

The second knob receiving aperture 122a may be disposed on at least a portion of a center portion of the second section 122. Referring to FIGS. 3A and 3B, it is important to note that the first knob receiving aperture 121a as disposed on the first section 121 may differ in positioning from the second knob receiving aperture 122a as disposed on the second section 122.

Collectively, the first section 121 and/or the second section 122 may receive the at least one second item 300 and/or the at least one third item 400. For example, a top surface of the first section 121 and/or a top surface of the second section 122 may receive the at least one second item 300 (e.g., a keyboard) and/or the at least one third item 400 (e.g., a computer mouse, a stylus, and/or a set of headphones). As such, the first section 121 and/or the second section 122 may have a size (e.g., length, width, dimension) corresponding to a size of the at least one second item 300 and/or the at least one third item 400, such that a size of the bottom platform 120 may be less than a size of the top platform 110.

The plurality of hinges 123 may be disposed between at least a portion of the first section 121 and/or the second section 122. Each of the plurality of hinges 123 may facilitate movement (i.e., pivot, rotate) of the second section 122 with respect to the first section 121.

The first knob 124 may be movably (i.e., rotatably) disposed on at least a portion of the center portion of the first section 121. The first knob 124 may move from disposed against the first section 121 in a first position to at least partially disposed away from the first section 121 in a second position in response to being moved in a first direction (i.e., clockwise) or a second direction (i.e., counterclockwise). Conversely, the first knob 124 may move from disposed away from the first section 121 in the second section to disposed against the first section 121 in the first position in response to being moved in the second direction or the first direction. In other words, the first knob 124 may be loosened from the first section 121 in response to being moved (i.e., rotated) in the first direction or the second direction, and tightened against the first section 121 in response to being moved in the second direction or the first direction.

The second knob 125 may be movably (i.e., rotatably) disposed on at least a portion of the center portion of the second section 122. The second knob 125 may move from disposed against the second section 122 in a first position to at least partially disposed away from the second section 122 in a second position in response to being moved in a first direction (i.e., clockwise) or a second direction (i.e., counterclockwise). Conversely, the second knob 125 may move from disposed away from the second section 122 in the second section to disposed against the second section 122 in the first position in response to being moved in the second direction or the first direction. In other words, the second knob 125 may be loosened from the second section 122 in response to being moved (i.e., rotated) in the first direction or the second direction, and tightened against the second section 122 in response to being moved in the second direction or the first direction.

During folding of the first section 121 and/or the second section 122, the first knob receiving aperture 121a may receive the first knob 124 therein and/or the second knob receiving aperture 122a may receive the second knob 125 therein. Accordingly, the first knob 124 may be removably inserted into the first knob receiving aperture 121a and/or the second knob 125 may be removably inserted in the second knob receiving aperture 122a. As such, absence of the first knob receiving aperture 121a and/or the second knob receiving aperture 122a may prevent the first section 121 and/or the second section 122 from being folded such that the first section 121 and/or the second section 122 may be flush and/or stored in a compact manner.

Figure 4A:
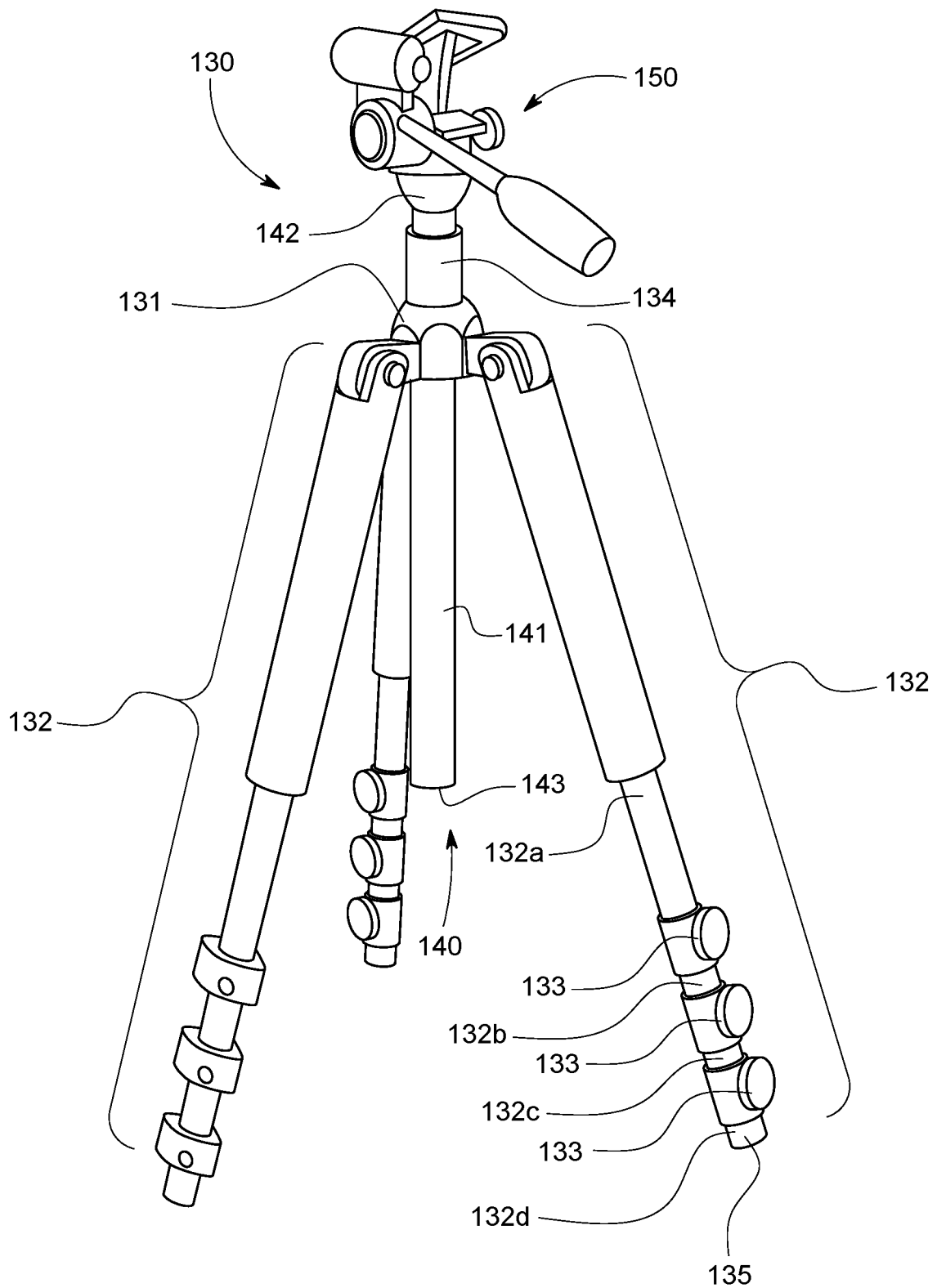
FIG. 4A illustrates a side perspective view of a base in a retracted position, according to an exemplary embodiment of the present general inventive concept.

FIG. 4A illustrates a side perspective view of a base 130 in a retracted position, according to an exemplary embodiment of the present general inventive concept.

Figure 4B:
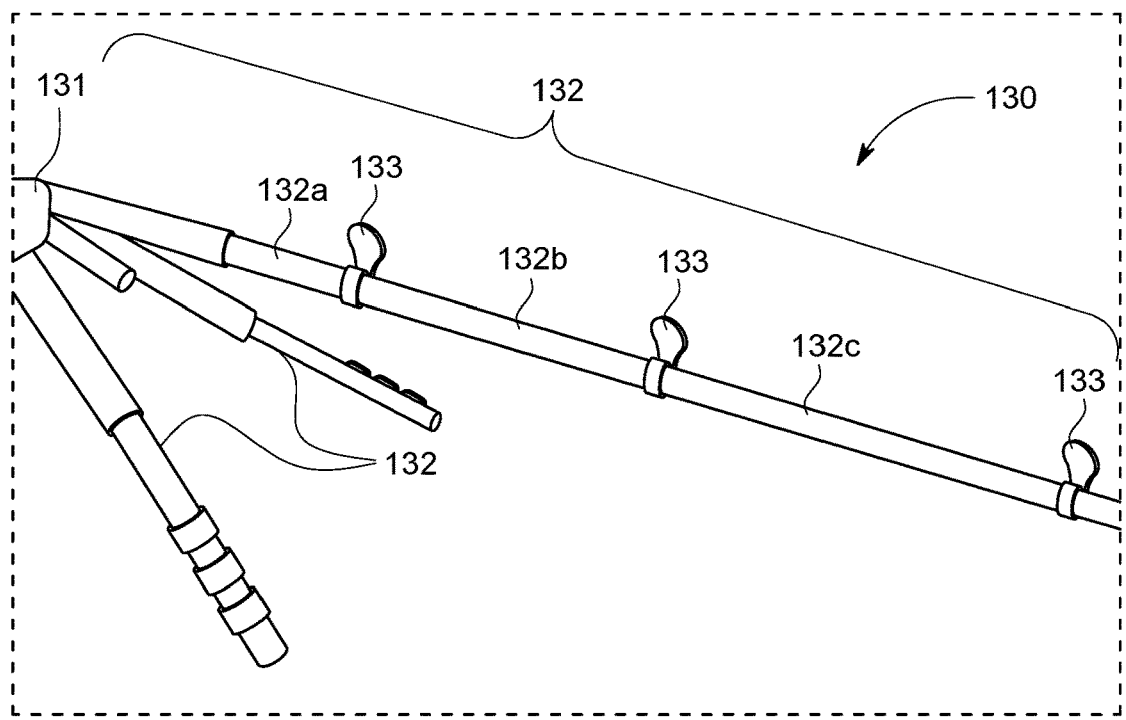
FIG. 4B illustrates a side perspective view of the base in a partially extended position, according to an exemplary embodiment of the present general inventive concept.

FIG. 4B illustrates a side perspective view of the base 130 in a partially extended position, according to an exemplary embodiment of the present general inventive concept.

Figure 4C:
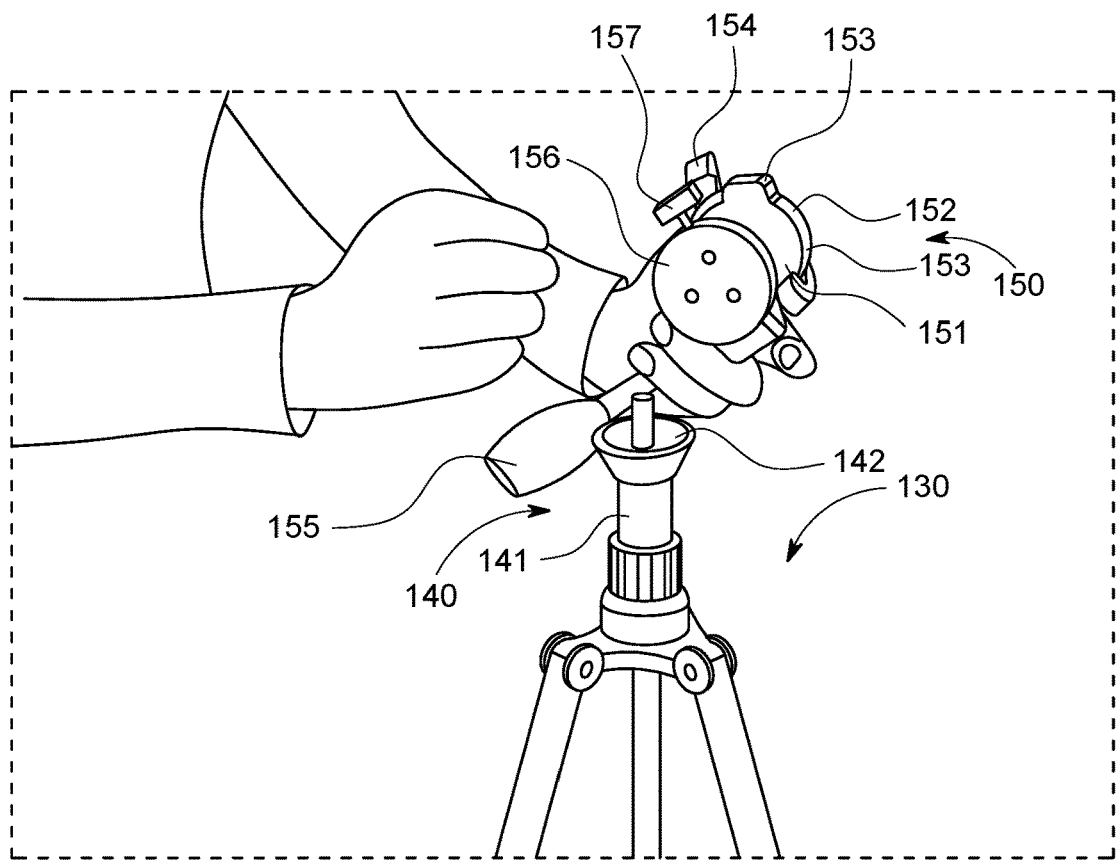
FIG. 4C illustrates an exploded view of the base and a platform adjuster, according to an exemplary embodiment of the present general inventive concept.

FIG. 4C illustrates an exploded view of the base 130 and a platform adjuster 150, according to an exemplary embodiment of the present general inventive concept.

The base 130 may include a center pole connector 131, a plurality of telescopic legs 132, a plurality of section locks 133, a center pole lock 134, and a plurality of stabilizing pads 135, but is not limited thereto.

The center pole connector 131 may be connected to the top platform 110 and/or the bottom platform 120.

The plurality of telescopic legs 132 may be movably (i.e., telescopically) disposed on at least a portion of the center pole connector 131. In other words, the plurality of telescopic legs 132 may move from retracted against the center pole connector 131 in a first position to at least partially extended away from the center pole connector 131 in a second position. Conversely, the plurality of telescopic legs 132 may move from extended away from the center pole connector 131 in the second position to retracted against the center pole connector 131 in the first position. The plurality of telescopic legs 132 may support the top platform 110 and/or the bottom platform 120 thereon while disposed on an external surface (e.g., a ground surface, a table, a desk).

Accordingly, the plurality of telescopic legs 132 may be retracted for storage and extended during use, such as a on a trip to a hotel and/or an office.

Each of the plurality of telescopic legs 132 may include a first leg section 132a, a second leg section 132b, a third leg section 132c, and a fourth leg section 132d, but is not limited thereto.

The first leg section 132a may have a size (e.g., circumference, diameter) greater than a size (e.g., circumference, diameter) of the second leg section 132b, the third leg section 132c, and/or the fourth leg section 132d. While each of the plurality of telescopic legs 132 are at least partially retracted, the second leg section 132b, the third leg section 132c, and/or the fourth leg section 132d may be retracted (e.g., inserted) within the first leg section 132a. Conversely, while each of the plurality of telescopic legs 132 are at least partially extended, the second leg section 132b, the third leg section 132c, and/or the fourth leg section 132d may be extended (e.g., extracted) away from the first leg section 132a.

The size of the second leg section 132b may be greater than the size of the third leg section 132c and/or the fourth leg section 132d. While each of the plurality of telescopic legs 132 are at least partially retracted, the third leg section 132c and/or the fourth leg section 132d may be retracted (e.g., inserted) within the second leg section 132b. Conversely, while each of the plurality of telescopic legs 132 are at least partially extended, the third leg section 132c and/or the fourth leg section 132d may be extended (e.g., extracted) away from the second leg section 132b.

The size of the third leg section 132c may be greater than the size of the fourth leg section 132d. While each of the plurality of telescopic legs 132 are at least partially retracted, the fourth leg section 132d may be retracted (e.g., inserted) within the third leg section 132c. Conversely, while each of the plurality of telescopic legs 132 are at least partially extended, the fourth leg section 132d may be extended (e.g., extracted) away from the third leg section 132c.

The plurality of section locks 133 may be movably (i.e., rotatably, pivotally, hingedly) disposed on at least a portion of the first leg section 132a, the second leg section 132b, and/or the third leg section 132c. Each of the plurality of section locks 133 may be connected to the second leg section 132b, the third leg section 132c, and/or the fourth leg section 132d. More specifically, a first of the plurality of section locks 133 may move from closed (i.e., locked) to opened (i.e., unlocked) to allow the second leg section 132b to be extracted from the first leg section 132a. Conversely, the first of the plurality of section locks 133 may be moved from opened to closed to prevent the second leg section 132b from being extracted from the first leg section 132a.

Similarly, a second of the plurality of section locks 133 may move from closed (i.e., locked) to opened (i.e., unlocked) to allow the third leg section 132c to be extracted from the second leg section 132b. Conversely, the second of the plurality of section locks 133 may be moved from opened to closed to prevent the third leg section 132c from being extracted from the second leg section 132b.

Lastly, a third of the plurality of section locks 133 may move from closed (i.e., locked) to opened (i.e., unlocked) to allow the fourth leg section 132d to be extracted from the third leg section 132c. Conversely, the third of the plurality of section locks 133 may be moved from opened to closed to prevent the fourth leg section 132d from being extracted from the third leg section 132c.

The center pole lock 134 may be movably (i.e., rotatably) disposed on at least a portion of the center pole connector 131. Moreover, the center pole lock 134 may have an aperture at a center thereof.

Each of the plurality of stabilizing pads 135 may include a friction surface (e.g., a rubber surface) and/or a textured surface (e.g., a plurality of bubbled protrusions extending away therefrom), but is not limited thereto.

The plurality of stabilizing pads 135 may be disposed on at least a portion of an end of the fourth leg section 132d. More specifically, the plurality of stabilizing pads 135 may be disposed on the fourth leg section 132d to contact the external surface. As such, the plurality of stabilizing pads 135 may prevent the top platform 110, the bottom platform 120, and/or the base 130 from moving (e.g., sliding) along the external surface. In other words, the plurality of stabilizing pads 135 may stabilize the top platform 110, the bottom platform 120, and/or the base 130 on the external surface.

The center pole 140 may include a pole body 141, a platform adjuster connector 142, and a pole release knob 143, but is not limited thereto.

The pole body 141 may be elongate and/or cylindrical shaped. The pole body 141 may be removably (i.e., inserted) connected to at least a portion of a center of the center pole connector 131 and/or a center of the center pole lock 134. In other words, the center pole connector 131 may receive the pole body 141 therein. The pole body 141 may be connected to the top platform 110 and/or the bottom platform 120, and/or connect the top platform 110 and/or the bottom platform 120 to the base 130.

The platform adjuster connector 142 may be disposed at a first end of the pole body 141. Additionally, the platform adjuster connector 142 may have a plurality of threads disposed thereon.

The pole release knob 143 may be removably (i.e., rotatably) connected to a second end of the pole body 141 opposite with respect to the first end of the pole body 141. Moreover, the pole release knob 143 may be moved (i.e., rotated) from disposed within the pole body 141 in a first position to at least partially extracted away from the pole body 141 in a second position. Conversely, the pole release knob 143 may be inserted and/or moved from extracted away from the pole body 141 in the second position to disposed within the pole body 141 in the first position. In other words, the pole release knob 143 may be extracted from the pole body 141 in response to being unscrewed, and inserted into the pole body 141 while being screwed in.

Furthermore, the pole body 141 may be fully extracted from the center pole connector 131 and/or the center pole lock 134 in response to removing the pole release knob 143 from the pole body 141. Thus, the pole body 141 may be prevented from being fully extracted from the center pole 131 and/or the center pole lock 134 in response to at least partially connecting (i.e., rotating) the pole release knob 143 into the pole body 141. Also, the center pole lock 134 may allow the pole body 141 to move (i.e., slide) therethrough in response to rotating in a first direction (i.e., clockwise) or a second direction (i.e., counterclockwise). However, the center pole lock 134 may prevent the pole body 141 from moving therethrough in response to rotating in the second direction or the first direction. Accordingly, the center pole lock 134 may facilitate adjusting a position (e.g., a height) of the pole body 141 within the center pole connector 131 while the pole release knob 143 may be used for full extraction of the pole body 141 from the center pole connector 131.

The platform adjuster 150 may include an adjuster body 151, a connector receiving channel 152, a plurality of walls 153, a connector adjustment knob 154, a handle 155, a base connector 156, and a base adjustment knob 157, but is not limited thereto.

The adjuster body 151 may be removably (i.e., rotatably) connected to at least a portion of the platform adjuster connector 142 and/or connected to the first platform 110.

The connector receiving channel 152 may be disposed on at least a portion of the adjuster body 151. The connector receiving channel 152 may extend across a length (e.g., a full length) of the adjuster body 151.

The plurality of walls 153 may be disposed on at least a portion of the adjuster body 151. Moreover, the plurality of walls 153 may be disposed on a first side and/or a second side of the connector receiving channel 152 opposite with respect to the first side of the connector receiving channel 152. The plurality of walls 153 may be elevated with respect to the connector receiving channel 152. In other words, the connector receiving channel 152 may be recessed with respect to the plurality of walls 153.

The connector adjustment knob 154 may movably (i.e., rotatably) disposed on at least a portion of the adjuster body 151.

The handle 155 may be movably (i.e., rotatably) disposed on at least a portion of the adjuster body 151. The handle 155 may facilitate gripping thereof. Moreover, the adjuster body 151 may move in response to an application of force (e.g., pushing, pulling) to the handle 155. For example, the adjuster body 151 may move (i.e., rotate, pivot) in a three hundred and sixty (360) degree direction and/or tilt in a first pivoting direction (i.e., forward) or a second pivoting direction (i.e., backward), such that a first end of the adjuster body 151 may move toward the pole body 141 while a second end of the adjuster body 151 moves away from the pole body 141, or the second end of the adjuster body 151 may move toward the pole body 141 while the first end of the adjuster body 151 moves away from the pole body 141. As such, the handle 155 may adjust a position of the at least one first item 200 as disposed on the first platform 110.

Furthermore, the handle 155 may be moved in a first rotational direction (i.e., clockwise) or a second rotational direction (i.e., counterclockwise) to facilitate (e.g., unlock) movement of the adjuster body 151 with respect to the base connector 156 (e.g., 360-degree rotation and/or tilting). However, the handle 155 may be moved in the second rotational direction or the first rotational direction to prevent movement of the adjuster body 151 with respect to the base connector 156.

The base connector 156 may be disposed on at least a portion of the adjuster body 151. The base connector 156 may have a plurality of threads disposed thereon. As such, the base connector 156 may threadably connect the adjuster body 151 to the platform adjuster connector 142 in response to being rotated thereon.

The base adjustment knob 157 may be movably (i.e., rotatably) disposed on at least a portion of the adjuster body 151. The base adjustment knob 157 may loosen the base connector 156 against the platform adjuster connector 142, such that the adjuster body 151 may move on the platform adjuster connector 142. Additionally, the base adjustment knob 157 may tighten the base connector 156 against the platform adjuster connector 142, such that the adjuster body 151 may be prevented from moving on the platform adjuster connector 142.

Figure 5A:
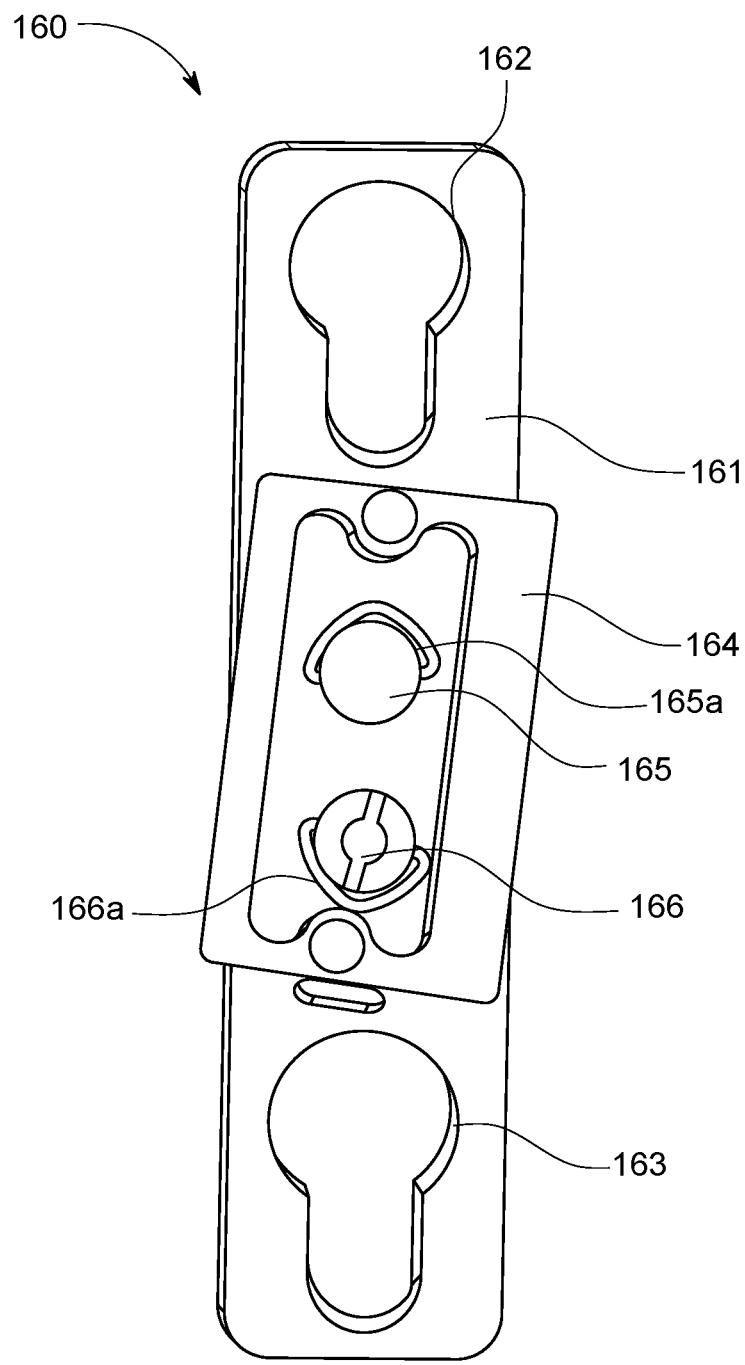
FIG. 5A illustrates a bottom perspective view of a top connector, according to an exemplary embodiment of the present general inventive concept.

FIG. 5A illustrates a bottom perspective view of a top connector 160, according to an exemplary embodiment of the present general inventive concept.

Figure 5B:
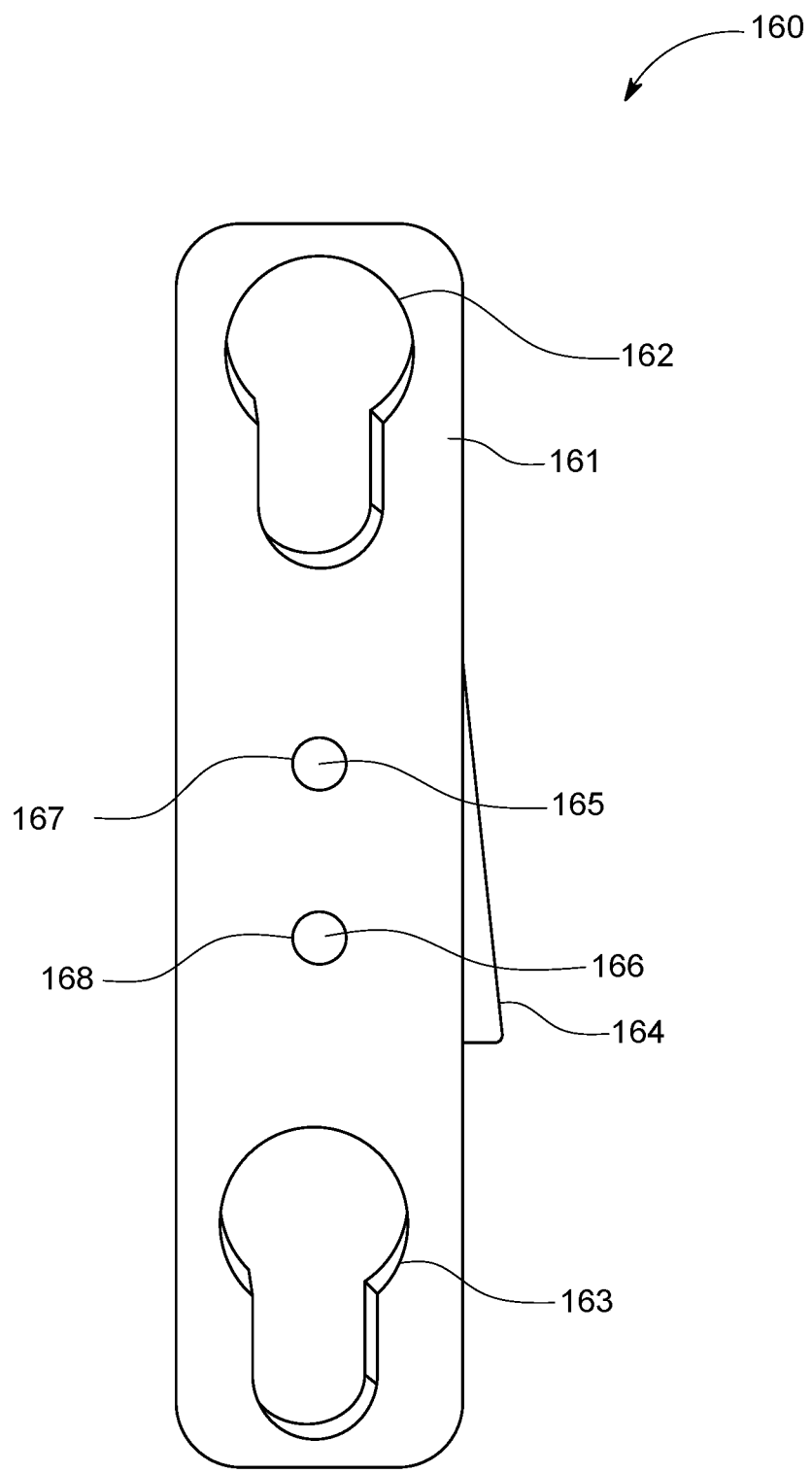
FIG. 5B illustrates a top perspective view of the top connector, according to an exemplary embodiment of the present general inventive concept.

FIG. 5B illustrates a top perspective view of the top connector 160, according to an exemplary embodiment of the present general inventive concept.

Referring to FIGS. 5A and 5B, the top connector 160 may include a top connector body 161, a first knob connecting aperture 162, a second knob connecting aperture 163, a platform connecting body 164, a first securing fastener 165, a second securing fastener 166, a first fastener aperture 167, and a second fastener aperture 168, but is not limited thereto.

Referring to FIGS. 5A and 5B, the top connector body 161 is illustrated to have a rounded rectangular prism shape. However, the top connector body 161 may be rectangular, circular, cylindrical, triangular, pentagonal, hexagonal, heptagonal, octagonal, or any other shape known to one of ordinary skill in the art, but is not limited thereto. Moreover, the top connector body 161 may be elongate.

The first knob connecting aperture 162 may be disposed at a first end of the top connector body 161. The first knob connecting aperture 162 may have a circular portion and a narrow portion, such that the narrow portion may have a thinner width with respect to a diameter of the circular portion. The first knob connecting aperture 162 may receive the first knob 114 of the first section 111 therein while the first knob 114 is disposed away from the first section 111. Subsequently, the first section 111, the second section 112, and/or the first knob 114 may be moved, such that the first knob 114 may move into the narrow portion of the first knob connecting aperture 162 and tightened to secure the top platform 110 against the top connector body 161.

The second knob connecting aperture 163 may be disposed at a second end of the top connector body 161 opposite with respect to the first end of the top connector body 161. The second knob connecting aperture 163 may have a circular portion and a narrow portion, such that the narrow portion may have a thinner width with respect to a diameter of the circular portion. Simultaneously, and/or in addition to movement of the first knob 114 in the first knob connecting aperture 162, as described above, the second knob connecting aperture 163 may receive the second knob 115 of the second section 112 therein while the second knob 115 is disposed away from the second section 112. Subsequently, the first section 111, the second section 112, and/or the second knob 115 may be moved, such that the second knob 115 may move into the narrow portion of the second knob connecting aperture 163 and tightened to secure the top platform 110 against the top connector body 161.

The platform connecting body 164 may be removably connected to at least a portion of a center of the top connector body 161. The platform connecting body 164 may removably connect the top connector body 161 to the adjuster body 151. More specifically, the platform connecting body 164 may be removably inserted (i.e., slid) into the connector receiving channel 152. Additionally, the connector adjustment knob 154 may move toward the platform connecting body 164 in response to being moved (i.e., rotated) in a first direction, such that the connector adjustment knob 154 may prevent movement (i.e., tighten) of the platform connecting body 164 within the connector receiving channel 152. Alternatively, the connector adjustment knob 154 may move away from the platform connecting body 164 in response to being moved in a second direction, such that the connector adjustment knob 154 may allow movement (i.e., loosen) of the platform connecting body 164 within the connector receiving channel 152.

The first securing fastener 165 may include a first fastener handle 165a, but is not limited thereto.

The first securing fastener 165 may be removably connected (i.e., inserted) into the platform connecting body 164. The first securing fastener 165 may connect the platform connecting body 164 to the top connector body 161. More specifically, the first securing fastener 165 may move toward the platform connecting body 164 in response to being moved (i.e., rotated) in a first direction, such that the first securing fastener 165 may prevent the platform connecting body 164 from moving away from the top connector body 161. Alternatively, the first securing fastener 165 may move away from the platform connecting body 164 in response to being moved in a second direction, such that the first securing fastener 165 may allow the platform connecting body 164 to move away from the top connector body 161.

The first fastener handle 165a may be movably (i.e., pivotally) disposed on at least a portion of the first securing fastener 165. The first fastener handle 165a may move from disposed against the first securing fastener 165 in a first position to at least partially extended away from the first securing fastener 165 in a second position. Conversely, the first fastener handle 165a may move from extended away from the first securing fastener 165 in the second position to disposed against the first securing fastener 165 in the first position. Accordingly, the first fastener handle 165a may facilitate gripping thereof.

The second securing fastener 166 may include a second fastener handle 166a, but is not limited thereto.

The second securing fastener 166 may be removably connected (i.e., inserted) into the platform connecting body 164. The second securing fastener 166 may connect the platform connecting body 164 to the top connector body 161. More specifically, the second securing fastener 166 may move toward the platform connecting body 164 in response to being moved (i.e., rotated) in a first direction, such that the second securing fastener 166 may prevent the platform connecting body 164 from moving away from the top connector body 161. Alternatively, the second securing fastener 166 may move away from the platform connecting body 164 in response to being moved in a second direction, such that the second securing fastener 166 may allow the platform connecting body 164 to move away from the top connector body 161.

The second fastener handle 166a may be movably (i.e., pivotally) disposed on at least a portion of the second securing fastener 166. The second fastener handle 166a may move from disposed against the second securing fastener 166 in a first position to at least partially extended away from the second securing fastener 166 in a second position. Conversely, the second fastener handle 166a may move from extended away from the second securing fastener 166 in the second position to disposed against the second securing fastener 166 in the first position. Accordingly, the second fastener handle 166a may facilitate gripping thereof.

Collectively, the first securing fastener 165 and/or the second securing fastener 166 may prevent movement (i.e., rotation) of the platform connecting body 164 against the top connector body 161.

The first fastener aperture 167 may be disposed on at least a portion of the top connector body 161. The first fastener aperture 167 may receive the first securing fastener 165 therein while disposed through the platform connecting body 164.

The second fastener aperture 168 may be disposed on at least a portion of the top connector body 161. The second fastener aperture 168 may receive the second securing fastener 166 therein while disposed through the platform connecting body 164.

Figure 6A:
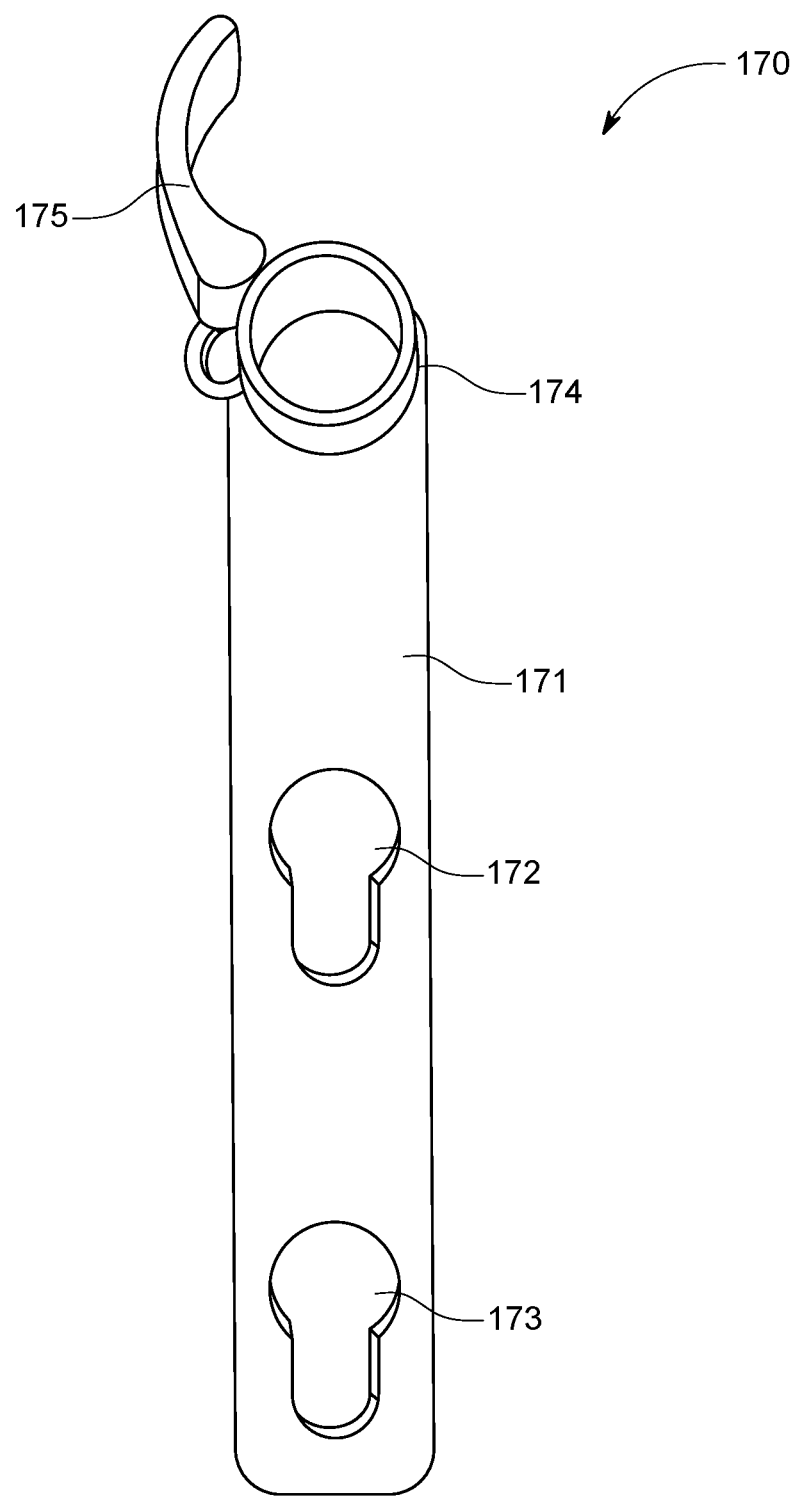
FIG. 6A illustrates a bottom perspective view of a bottom connector, according to an exemplary embodiment of the present general inventive concept.

FIG. 6A illustrates a bottom perspective view of a bottom connector 170, according to an exemplary embodiment of the present general inventive concept.

Figure 6B:
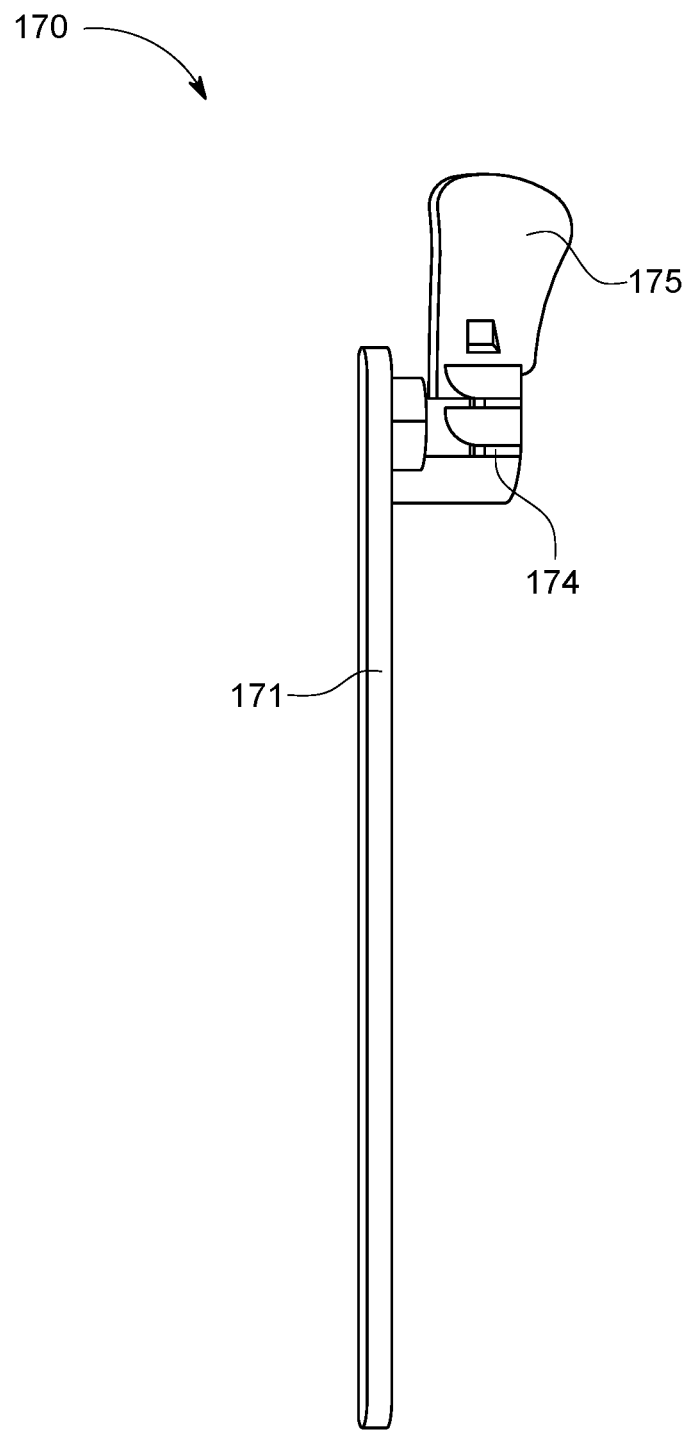
FIG. 6B illustrates a side perspective view of the bottom connector, according to an exemplary embodiment of the present general inventive concept.

FIG. 6B illustrates a side perspective view of the bottom connector 170, according to an exemplary embodiment of the present general inventive concept.

The bottom connector 170 may include a bottom connector body 171, a first knob connecting aperture 172, a second knob connecting aperture 173, a clamp 174, and a clamp knob 175, but is not limited thereto.

Referring to FIG. 6A, the bottom connector body 171 is illustrated to have a rounded rectangular prism shape. However, the bottom connector body 171 may be rectangular, circular, cylindrical, triangular, pentagonal, hexagonal, heptagonal, octagonal, or any other shape known to one of ordinary skill in the art, but is not limited thereto. Moreover, the top connector body 161 may be elongate.

The first knob connecting aperture 172 may be disposed at a center of the bottom connector body 171. The first knob connecting aperture 172 may have a circular portion and a narrow portion, such that the narrow portion may have a thinner width with respect to a diameter of the circular portion. The first knob connecting aperture 172 may receive the first knob 124 of the first section 121 therein while the first knob 124 is disposed away from the first section 121. Subsequently, the first section 121, the second section 122, and/or the first knob 124 may be moved, such that the first knob 124 may move into the narrow portion of the first knob connecting aperture 172 and tightened to secure the bottom platform 110 against the bottom connector body 171.

The second knob connecting aperture 173 may be disposed at a first end of the bottom connector body 171. The second knob connecting aperture 173 may have a circular portion and a narrow portion, such that the narrow portion may have a thinner width with respect to a diameter of the circular portion. Simultaneously, and/or in addition to movement of the first knob 124 in the first knob connecting aperture 172, as described above, the second knob connecting aperture 173 may receive the second knob 125 of the second section 122 therein while the second knob 125 is disposed away from the second section 122. Subsequently, the first section 121, the second section 122, and/or the second knob 125 may be moved, such that the second knob 125 may move into the narrow portion of the second knob connecting aperture 173 and tightened to secure the bottom platform 120 against the bottom connector body 171.

The clamp 174 may be disposed at a second end of the bottom connector body 171 opposite with respect to the first end of the bottom connector body 171. The clamp 174 may have an aperture disposed at a center thereof. The clamp 174 may receive the pole body 141 therethrough. As such, the clamp 174 may removably connect the bottom connector body 171 to the pole body 141.

The clamp knob 175 may be movably (i.e., rotatably) disposed on at least a portion of the clamp 174. The clamp knob 175 may move from retracted against the clamp 174 in a first position to at least partially extended away from the clamp 174 in a second position. Conversely, the clamp knob 175 may move from extended away from the clamp 174 in the second position to retracted against the clamp 174 in the first position. As such, the clamp knob 175 may tighten the clamp 174 while retracted against the clamp 174 and loosen the clamp 174 while extended away from the clamp 174. Accordingly, the bottom connector body 171 may move along the pole body 141 while the clamp 174 is loosened and may be prevented from moving while the clamp 174 is tightened.

Figure 7A:
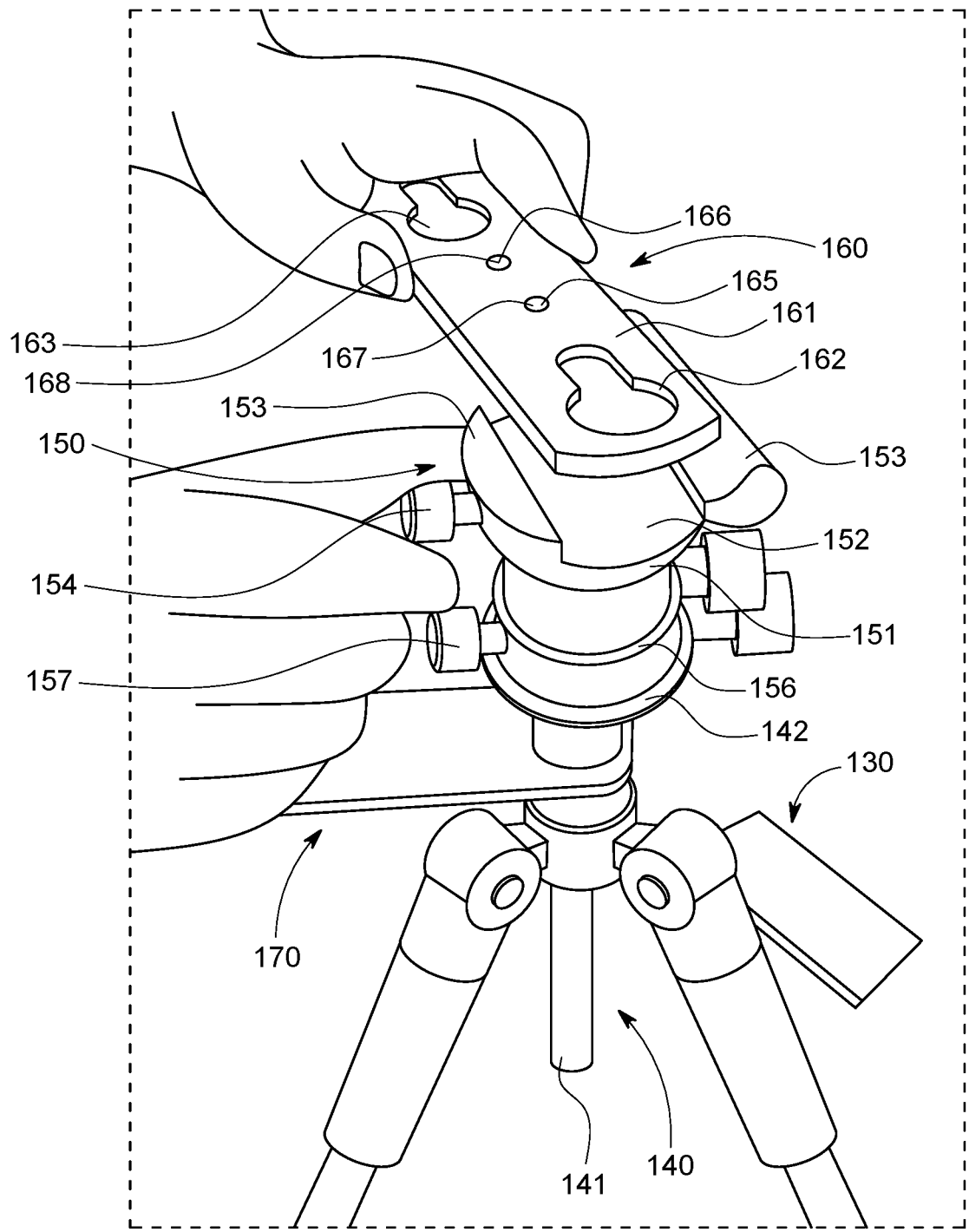
FIG. 7A illustrates a top isometric view of the top connector being connected to the platform adjuster, according to an exemplary embodiment of the present general inventive concept.

FIG. 7A illustrates a top isometric view of the top connector 160 being connected to the platform adjuster 150, according to an exemplary embodiment of the present general inventive concept.

Figure 7B:
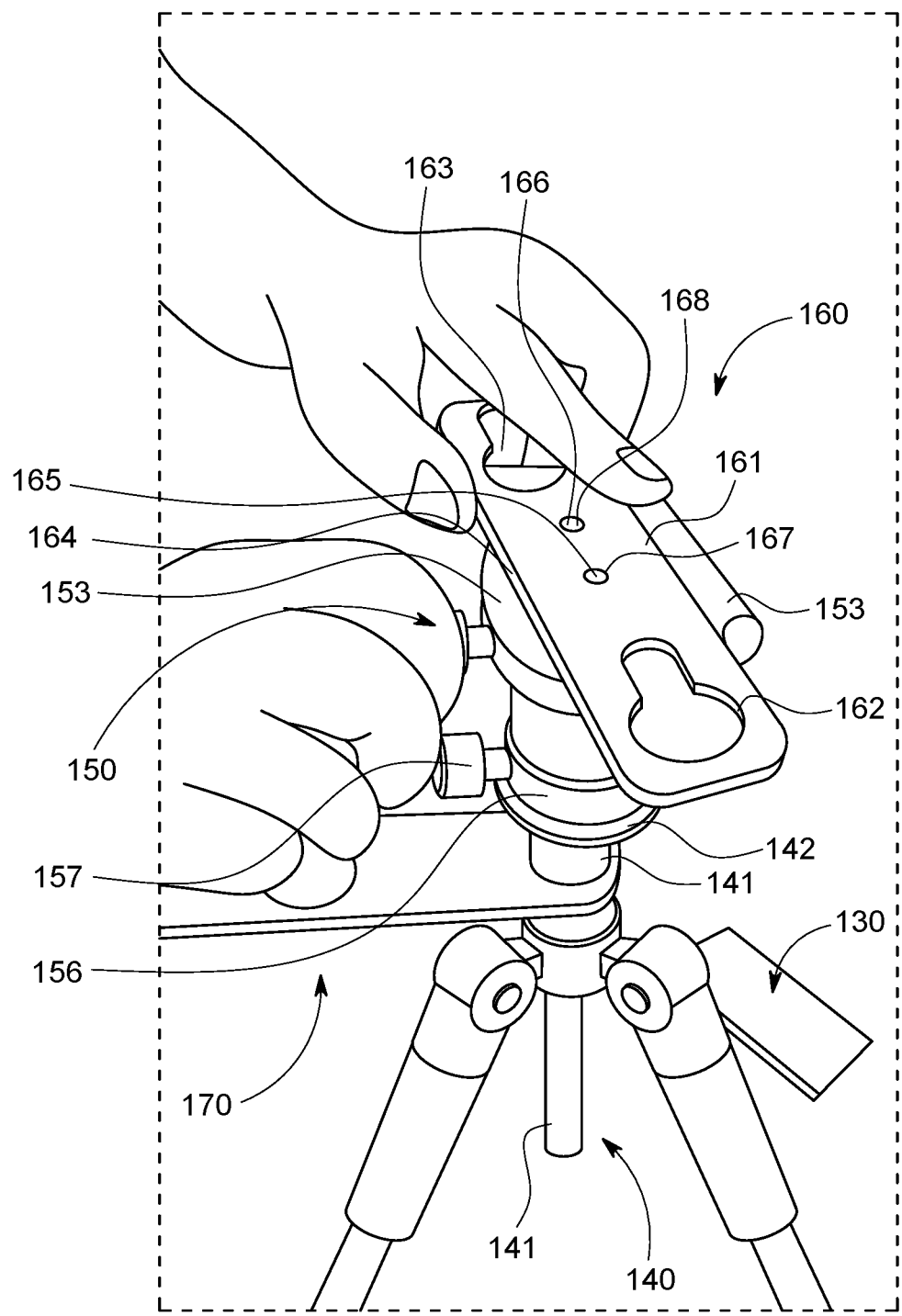
FIG. 7B illustrates a top isometric view of the top connector connected to the platform adjuster, according to an exemplary embodiment of the present general inventive concept.

FIG. 7B illustrates a top isometric view of the top connector 160 connected to the platform adjuster 150, according to an exemplary embodiment of the present general inventive concept.

Figure 8:
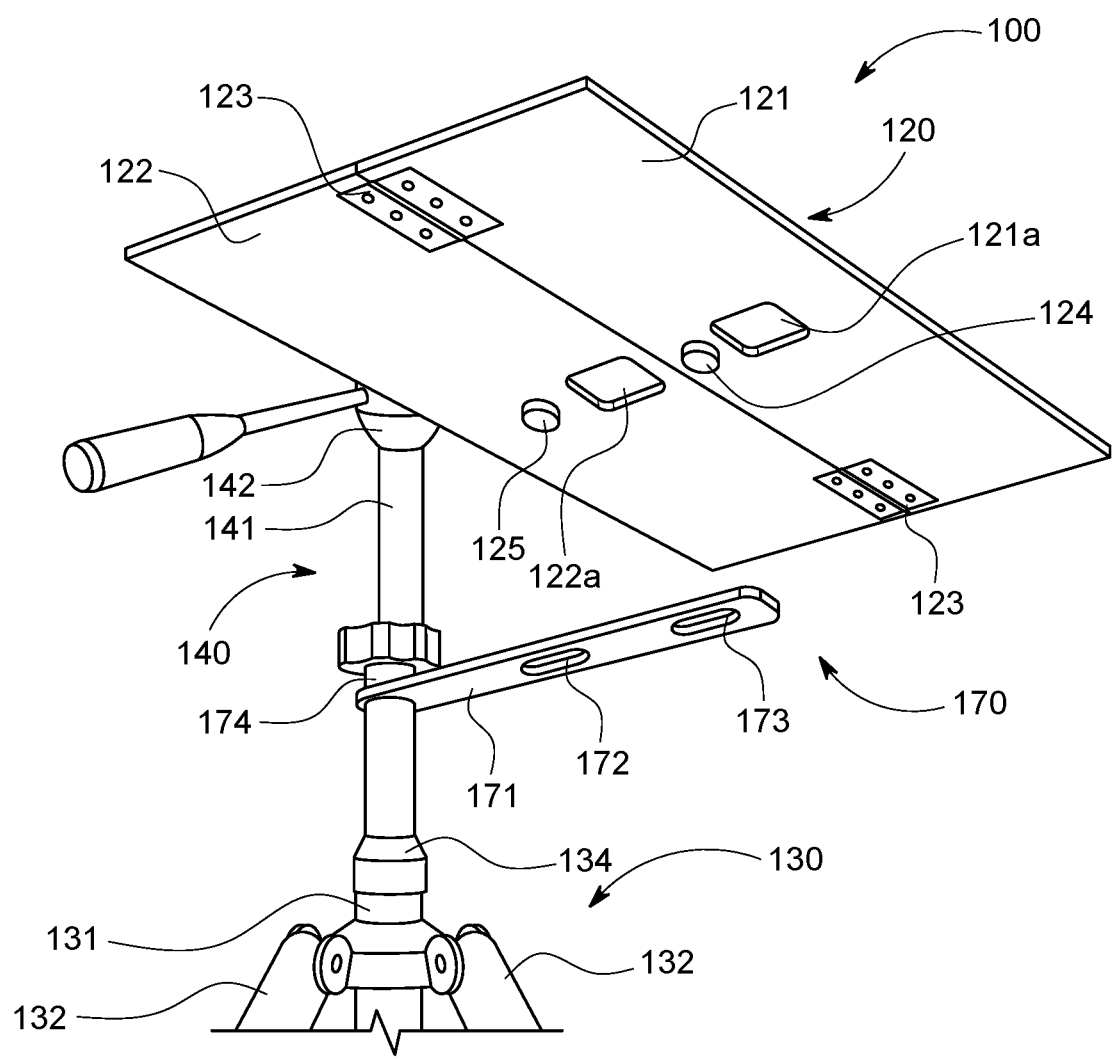
FIG. 8 illustrates a bottom isometric view of the bottom platform being connected to the bottom connector, according to an exemplary embodiment of the present general inventive concept.

FIG. 8 illustrates a bottom isometric view of the bottom platform 120 being connected to the bottom connector 170, according to an exemplary embodiment of the present general inventive concept.

During use, each component, as described above, may be detached and/or disassembled from each other for easy storage. However, each component may be easily assembled. The base 130 may be disposed on the external surface using the plurality of telescopic legs 132. The center pole 140 may already be connected to the base 130. As such, the platform adjuster 150 may be connected to the platform adjuster connector 142. Subsequently, the pole release knob 143 may be removed to allow the pole body 141 to be extracted from the base 130. The clamp 174 of the bottom connector 170 may receive the pole body 141 therethrough and secured using the clamp knob 175.

Additionally, the pole body 141 may be reinserted through the center pole connector 131 of the base 130. The pole release knob 143 may be reconnected to the pole body 141. The platform connecting body 164 of the top connector 160 may be connected to the connector receiving channel 152 of the platform adjuster 150. The connector adjustment knob 154 may be moved to tighten the platform connecting body 164 within the connector receiving channel 152. The handle 155 may be rotated in a first direction to move the adjuster body 151 to a position as desired by a user and then rotated in an opposite direction to lock the adjuster body 151.

Thereafter, the top platform 110 may be unfolded. The first knob 114 and/or the second knob 115 may be loosened to be inserted into the first knob connecting aperture 162 and/or the second knob connecting aperture 163, respectively. The first knob 114 and/or the second knob 115 may be tightened to secure the top platform 110 to the top connector 160. Similarly, the bottom platform 120 may be unfolded. The first knob 124 and/or the second knob 125 may be loosened to be inserted into the first knob connecting aperture 172 and/or the second knob connecting aperture 173, respectively. The first knob 124 and/or the second knob 125 may be tightened to secure the bottom platform 120 to the bottom connector 170. Accordingly, the top platform 110 may be disposed on at a first plane and the bottom platform 120 may be disposed at a second plane different from the first plane.

Each of the plurality of telescopic legs 132 may be moved (e.g., extended and/or retracted) to adjust a height as desired by the user.

Therefore, the collapsible standing desk 100 may be a portable standing desk that can be brought during travel to provide an alternative to a sitting desk. Also, the collapsible standing desk 100 can be easily and/or ergonomically stored after being collapsed, such as in a carrying container.

The present general inventive concept may include a collapsible standing desk 100, including a top platform 110 to receive at least one first item 200 thereon, a bottom platform 120 connected to the top platform 110 to receive at least one second item 300 and at least one third item 400 thereon, a base 130 removably connected to the top platform 110 and the bottom platform 120 to support the top platform 110 and the bottom platform 120 thereon while disposed on an external surface, and a center pole 140 removably connected to the base 130 to connect the top platform 110 and the bottom platform 120 to the base 130.

The top platform 110 and the bottom platform 120 may each include a first section 111/121, and a second section 112/122 movably disposed on at least a portion of the first section 111/121 to move toward the first section 111/121 in a first rotational direction, and away from the first section 111/121 in a second rotational direction opposite with respect to the first rotational direction.

The first section 111/121 may include a first knob receiving aperture 111a/121a disposed on at least a portion of the first section 111/121.

The second section 112/122 may include a second knob receiving aperture 112a/122a disposed on at least a portion of the second section 112/122.

The top platform 110 and the bottom platform 120 may each further include a first knob 114/124 movably disposed on at least a portion of the first section 111/121 to loosen from the first section 111/121 in response to moving in a first direction and tighten against the first section 111/121 in response to moving in a second direction, and a second knob 115/125 movably disposed on at least a portion of the second section 112/122 to loosen from the second section 112/122 in response to moving in a first direction and tighten against the second section 112/122 in response to moving in a second direction.

The first knob receiving aperture 111a/121a may receive the first knob 114/124 and the second knob receiving aperture 112a/122a receives the second knob 115/125 in response to folding the first section 111/121 against the second section 112/122.

The base 130 may include a center pole connector 131 to receive the center pole 140 therein, and a plurality of telescopic legs 132 movably disposed on at least a portion of the center pole connector 131 to move from retracted against the center pole connector 131 in a first position to at least partially extended away from the center pole connector 131 in a second position, and move from extended away from the center pole connector 131 in the second position to retracted against the center pole connector 131 in the first position.

The base 130 may further include a plurality of section locks 133 movably disposed on at least a portion of each of the plurality of telescopic legs 132 to prevent at least one section 132a/132b/132c/132d of each of the plurality of telescopic legs 132 from being extracted in a first position, and allow the at least one section 132a/132b/132c/132d of each of the plurality of telescopic legs 132 to be extracted in a second position.

The center pole 140 may include a pole body 141, and a pole release knob 143 disposed at an end of the pole body 141 to allow the pole body 141 to be extracted from the base 130 in response to being removed from the pole body 141, and prevent the pole body 141 from being extracted from the base 130 in response to at least partially connecting to the pole body 141.

The collapsible standing desk 100 may further include a platform adjuster 150 removably connected to the center pole 140 to receive the top platform 110 thereon and adjust a position of the top platform 110 in response to moving the platform adjuster 150.

The platform adjuster 150 may include an adjuster body 151, a connector receiving channel 152 disposed on at least a portion of the adjuster body 151, a plurality of walls 153 disposed on each side of the connector receiving channel 152, such that the connector receiving channel 152 is recessed with respect to the plurality of walls 153, and a connector adjustment knob 154 movably disposed on at least a portion of the adjuster body 151.

The collapsible standing desk 100 may further include a top connector 160 removably connected to the to the adjuster body 151 to receive the top platform 110 thereon.

The top connector 160 may include a top connector body 161, a first knob connecting aperture 162 disposed at a first end of the top connector body 161 to receive a first knob 114 of the top platform 110 therein, a second knob connecting aperture 163 disposed at a second end of the top connector body 161 to receive a second knob 115 of the top platform 110 therein, and a platform connecting body 164 removably connected to at least a portion of the top connector body 161 to removably connect to the connector receiving channel 152.

The connector adjustment knob 154 may prevent movement of the platform connecting body 164 within the connector receiving channel 152 in response to moving in a first direction, and allows movement of the platform connecting body 164 within the connector receiving channel 152 in response to moving in a second direction.

The top connector 160 may further include a first securing fastener 165 removably connected into the platform connecting body 164 to connect the platform connecting body 164 to the top connector body 161, and a second securing fastener 166 removably connected into the platform connecting body 164 to connect the platform connecting body 164 to the top connector body 161.

The collapsible standing desk 100 may further include a bottom connector 170 removably connected to the to the center pole 140 to receive the bottom platform 120 thereon.

The bottom connector 170 may include a bottom connector body 171, a first knob connecting aperture 172 disposed at a center of the bottom connector body 171 to receive a first knob 124 of the bottom platform 120 therein, a second knob connecting aperture 173 disposed at a first end of the bottom connector body 171 to receive a second knob 125 of the bottom platform 120 therein, and a clamp 174 disposed at a second end of the bottom connector body 171 to receive the center pole 140 therethrough.

The top platform 110 may be disposed on a first plane and the bottom platform 120 is disposed on a second plane different from the first plane.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A collapsible standing desk, comprising:
a top platform to receive at least one first item thereon;
a bottom platform connected to the top platform to receive at least one second item thereon, the bottom platform comprising:
a first section of the bottom platform comprising a knob receiving aperture disposed on at least a portion of the first section of the bottom platform, and
a second section of the bottom platform movably disposed on at least a portion of the first section of the bottom platform to move toward the first section of the bottom platform in a first rotational direction, and away from the first section of the bottom platform in a second rotational direction opposite with respect to the first rotational direction;
a base removably connected to the top platform and the bottom platform to support the top platform and the bottom platform thereon while the base is disposed on an external surface; and
a center pole removably connected to the base to connect the top platform and the bottom platform to the base, such that the top platform is removably connected to and disposed above a topmost portion of the center pole.

2. The collapsible standing desk of claim 1, wherein the top platform comprises:
a first section of the top platform; and
a second section of the top platform movably disposed on at least a portion of the first section of the top platform to move toward the first section of the top platform in a first rotational direction, and away from the first section of the top platform in a second rotational direction opposite with respect to the first rotational direction.

3. The collapsible standing desk of claim 2, wherein the first section of the top platform comprises:
a first knob receiving aperture disposed on at least a portion of the first section of the top platform.

4. The collapsible standing desk of claim 3, wherein the second section of the top platform comprises:
a second knob receiving aperture disposed on at least a portion of the second section.

5. The collapsible standing desk of claim 4, wherein the top platform further comprises:
a first knob movably disposed on at least a portion of the first section of the top platform to loosen from the first section of the top platform in response to moving in a first direction and tighten against the first section in response to moving in a second direction; and
a second knob movably disposed on at least a portion of the second section of the top platform to loosen from the second section of the top platform in response to moving in a first direction and tighten against the second section of the top platform in response to moving in a second direction.

6. The collapsible standing desk of claim 5, wherein the first knob receiving aperture receives the first knob and the second knob receiving aperture receives the second knob in response to folding the first section of the top platform against the second section of the top platform.

7. The collapsible standing desk of claim 1, wherein the base comprises:
a center pole connector to receive the center pole therein; and
a plurality of telescopic legs movably disposed on at least a portion of the center pole connector to move from retracted against the center pole connector in a first position to at least partially extended away from the center pole connector in a second position, and move from extended away from the center pole connector in the second position to retracted against the center pole connector in the first position.

8. The collapsible standing desk of claim 7, wherein the base further comprises:
a plurality of section locks movably disposed on at least a portion of each of the plurality of telescopic legs to prevent at least one section of each of the plurality of telescopic legs from being extracted in a first position, and allow the at least one section of each of the plurality of telescopic legs to be extracted in a second position.

9. The collapsible standing desk of claim 1, wherein the center pole comprises:
a pole body; and
a pole release knob disposed at an end of the pole body to allow the pole body to be extracted from the base in response to being removed from the pole body, and prevent the pole body from being extracted from the base in response to at least partially connecting to the pole body.

10. A collapsible standing desk, comprising:
a top platform to receive at least one first item thereon;
a bottom platform connected to the top platform to receive at least one second item thereon;
a base removably connected to the top platform and the bottom platform to support the top platform and the bottom platform thereon while the base is disposed on an external surface;
a center pole removably connected to the base to connect the top platform and the bottom platform to the base, such that the top platform is removably connected to and disposed above a topmost portion of the center pole; and
a platform adjuster removably connected to the center pole to receive the top platform thereon and adjust a position of the top platform in response to moving the platform adjuster, wherein the platform adjuster comprises:
an adjuster body,
a connector receiving channel disposed on at least a portion of the adjuster body,
a plurality of walls disposed on each side of the connector receiving channel, such that the connector receiving channel is recessed with respect to the plurality of walls, and
a connector adjustment knob movably disposed on at least a portion of the adjuster body.

11. The collapsible standing desk of claim 10, further comprising:
a top connector removably connected to the to the adjuster body to receive the top platform thereon.

12. The collapsible standing desk of claim 11, wherein the top connector comprises:
a top connector body;
a first knob connecting aperture disposed at a first end of the top connector body to receive a first knob of the top platform therein;
a second knob connecting aperture disposed at a second end of the top connector body to receive a second knob of the top platform therein; and
a platform connecting body removably connected to at least a portion of the top connector body to removably connect to the connector receiving channel.

13. The collapsible standing desk of claim 12, wherein the connector adjustment knob prevents movement of the platform connecting body within the connector receiving channel in response to moving in a first direction, and allows movement of the platform connecting body within the connector receiving channel in response to moving in a second direction.

14. The collapsible standing desk of claim 12, wherein the top connector further comprises:
a first securing fastener removably connected into the platform connecting body to connect the platform connecting body to the top connector body; and
a second securing fastener removably connected into the platform connecting body to connect the platform connecting body to the top connector body.

15. A collapsible standing desk, comprising:
a top platform to receive at least one first item thereon;
a bottom platform connected to the top platform to receive at least one second item thereon;
a base removably connected to the top platform and the bottom platform to support the top platform and the bottom platform thereon while disposed on an external surface;
a center pole removably connected to the base to connect the top platform and the bottom platform to the base, such that the top platform is removably connected to and disposed above a topmost portion of the center pole; and a bottom connector removably connected to the to the center pole to receive the bottom platform thereon, wherein the bottom connector comprises:

a bottom connector body, a first knob connecting aperture disposed at a center of the bottom connector body to receive a first knob of the bottom platform therein, a second knob connecting aperture disposed at a first end of the bottom connector body to receive a second knob of the bottom platform therein, and a clamp disposed at a second end of the bottom connector body to receive the center pole therethrough.

16. The collapsible standing desk of claim 1, wherein the top platform is disposed on a first plane and the bottom platform is disposed on a second plane different from the first plane.

17. A collapsible standing desk, comprising:

a platform to receive at least one first item thereon;

a first section comprising a knob receiving aperture disposed on at least a portion of the first section; and a second section movably disposed on at least a portion of the first section to move toward the first section in a first rotational direction, and away from the first section in a second rotational direction opposite with respect to the first rotational direction;

a base removably connected to the platform to support the platform thereon while the base is disposed on an external surface; and a connecting portion removably connected to the base to connect the platform to the base, such that the top platform is removably connected to and disposed above a top portion of the connecting portion.

18. The collapsible standing desk of claim 17, further comprising:

a knob movably disposed on at least a portion of the second section to be inserted into the knob receiving aperture in response to the first section being folded against the second section.

19. A collapsible standing desk, comprising:

a top platform to receive at least one first item thereon, the top platform comprising:

a first section of the top platform, and a second section of the top platform movably disposed on at least a portion of the first section of the top platform to move toward the first section of the top platform in a first rotational direction, and away from the first section of the top platform in a second rotational direction opposite with respect to the first rotational direction;

a bottom platform connected to the top platform to receive at least one second item and at least one third item thereon, the bottom platform comprising:

a first section of the bottom platform, and a second section of the bottom platform movably disposed on at least a portion of the first section of bottom top platform to move toward the first section of the bottom platform in a first rotational direction, and away from the first section of the bottom platform in a second rotational direction opposite with respect to the first rotational direction;

a base removably connected to the top platform and the bottom platform to support the top platform and the bottom platform thereon while the base is disposed on an external surface; and a center pole removably connected to the base to connect the top platform and the bottom platform to the base, such that the top platform is removably connected to and disposed above a topmost portion of the center pole.

* * * * *